(12) United States Patent
Pedersen et al.

(10) Patent No.: US 7,165,502 B2
(45) Date of Patent: Jan. 23, 2007

(54) TRAWLING VESSEL WITH A LOCK CHAMBER

(75) Inventors: Roar Pedersen, AÅlesund (NO); Håvard Røsvik, Trondheim (NO); Birger Enerhaug, Ranheim (NO); Snorre Angell, Trondheim (NO); Oddmar Saure, Sæbø (NO); Svein Helge Gjøsund, Trondheim (NO)

(73) Assignees: Sintef Fiskeri havbruk AS, Trondheim (NO); Fiskerstrand Verft AS, Fiskarstrand (NO); Rolls Royce Marine AS, Aslesund (NO)

( * ) Notice: Subject to any disclaimer, the term of this patent is extended or adjusted under 35 U.S.C. 154(b) by 92 days.

(21) Appl. No.: 10/501,480

(22) PCT Filed: Jan. 16, 2003

(86) PCT No.: PCT/NO03/00014

§ 371 (c)(1),
(2), (4) Date: Jul. 14, 2004

(87) PCT Pub. No.: WO03/059731

PCT Pub. Date: Jul. 24, 2003

(65) Prior Publication Data

US 2005/0087119 A1   Apr. 28, 2005

(30) Foreign Application Priority Data

Jan. 16, 2002   (NO) ................................. 20020247
Aug. 7, 2002   (NO) ................................. 20023747

(51) Int. Cl.
*A01K 73/02*   (2006.01)
*B63B 35/16*   (2006.01)
*B63B 35/18*   (2006.01)
*B63B 35/26*   (2006.01)
*B63B 21/66*   (2006.01)

(52) U.S. Cl. ............................... 114/255; 43/8; 43/9.1; 114/253

(58) Field of Classification Search ................ 114/255, 114/253, 254; 43/4.5, 6.5–9.95
See application file for complete search history.

(56) References Cited

U.S. PATENT DOCUMENTS 6,138,397 A   10/2000   Hammersland et al.

FOREIGN PATENT DOCUMENTS

DE   89769   12/1896

(Continued)

*Primary Examiner*—Ajay Vasudeva
(74) *Attorney, Agent, or Firm*—Birch, Stewart, Kolasch & Birch, LLP

(57) ABSTRACT

A trawling vessel is provided with a trawl net (5) for catching marine bio-resources, with a trawl sack (3) attached aft on a trawl net (5) for keeping the catch. The vessel comprises lines (51, 61) for towing and hauling the trawl net (5), and trawl drums (6) for hauling the trawl net (5). A lock chamber (1) is provided in a stern (21) of the vessel and has a main portion of its volume arranged below the design water line of the vessel. The lock chamber (1) is arranged for hauling the trawl sack (3) with the catch from the sea through a sluiceway (2) in the stern (21), for discharging the trawl sack (3), and for temporarily keeping the catch. A trunk channel (16, 12) leading up from the lock chamber (1) enables the trawl sack (3), in a generally discharged state, to be hauled up through the trunk channel (16, 12) to a deck (24), thereby leaving the catch in the lock chamber (1).

28 Claims, 17 Drawing Sheets

FOREIGN PATENT DOCUMENTS

| | | |
|---|---|---|
| DE | 839164 C | 5/1952 |
| EP | 0 467 003 A1 | 1/1992 |
| GB | 1555437 A | 11/1979 |
| NO | 94 493 | 6/1959 |
| SU | 551220 A * | 5/1977 |
| SU | 622713 A * | 7/1978 |
| SU | 772916 B * | 10/1980 |
| SU | 1244009 A * | 7/1986 |
| SU | 1681800 A1 * | 10/1991 |
| WO | WO-8100664 A1 | 3/1981 |

* cited by examiner

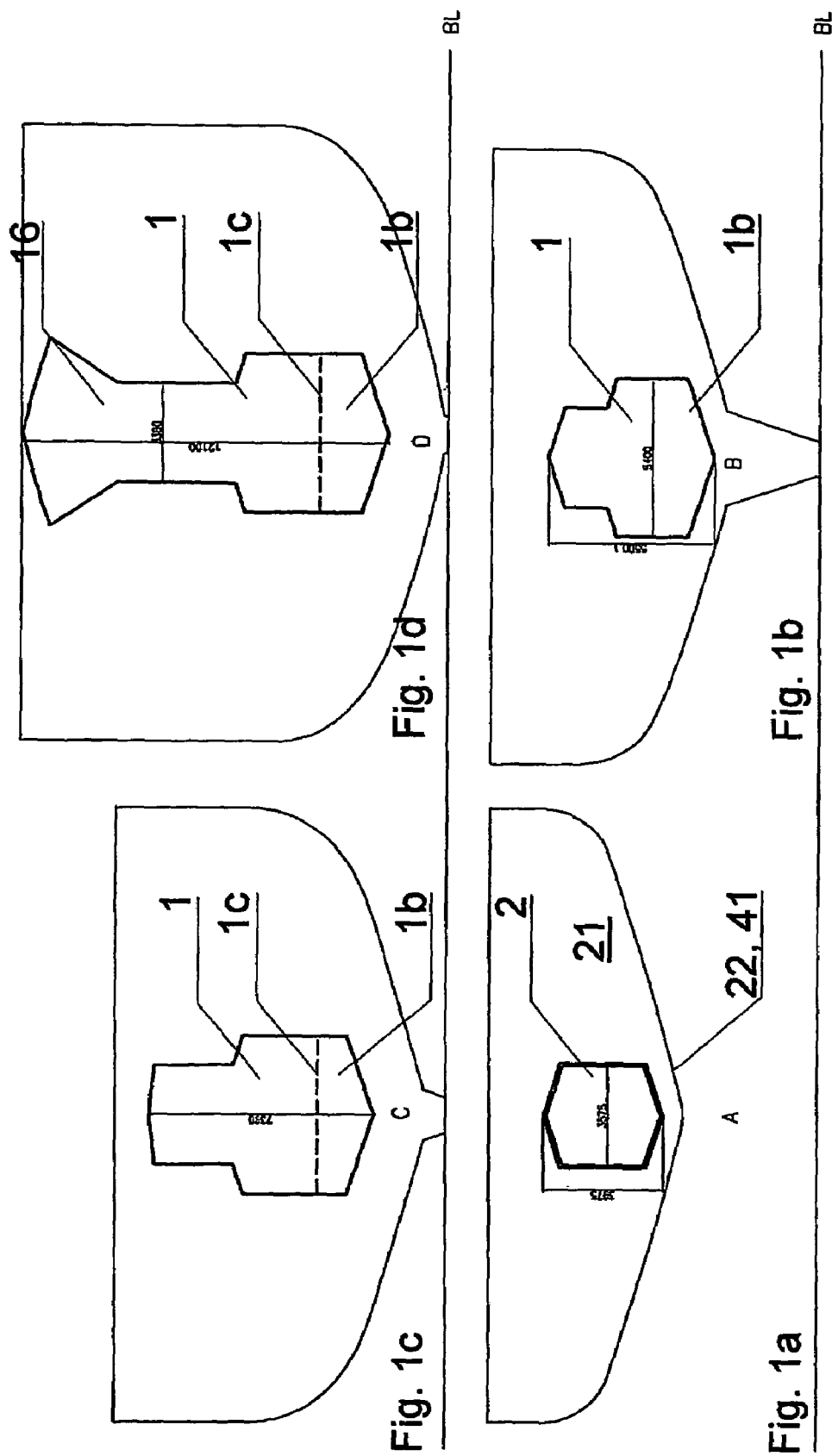

TRAWLING VESSEL WITH A LOCK CHAMBER

The invention relates to a trawler. More specifically, the invention relates to hauling a trawl sack or so-called "cod end" so that the catch is brought on board to the trawler in a gentle way, both for the trawl sack, and for the catch.

KNOWN ART

During ordinary trawling, a trawl system comprises towing wires, trawl doors or "paravanes" for spreading the front end of the trawl net, sweep wires, and trawl. The trawl comprises a funnel-shaped trawl net ending in a trawl sack or "cod end" that collects the fish. The trawl system is towed until indicators attached to the trawl sack indicate that a desired amount of fish has entered the trawl sack. The trawl system is then taken in by hauling the towing wire until the trawl doors have entered their positions in their trawl door gallows arranged on either side of the vessel's stern. The trawl doors are disconnected and the trawl net is hauled in after the sweep wires by means of separate winches. The trawl net is hauled in on deck or on a drum, until the trawl sack has come entirely up onto the trawl slipway which is arranged in the vessel's stern in order to facilitate hauling of the heavy trawl sack out of the water and on board onto the deck. In order to get the trawl sack up along the slipway and onto the deck, a heavy rope of synthetic material or a wire is attached to the sack, where after it is hauled in onto the deck where it is opened and discharged. This is the all over dominating way of trawl fishing.

By the stern end and the top of the trawl slipway the trawl sack containing the fish catch must pass an edge at the stem and an edge toward the trawl deck, correspondingly, both where the trawl sack is consecutively kinked over the edge when it is hauled in. Simultaneously, the pitching of the vessel will incur that the stern moves up and down and incurs cyclic pressure increase and pressure decrease towards the underside of the trawl sack. These stretch and bending forces acting on the trawl sack, and the pressure forces induced by the own weight of the fish towards the underlying part of the catch, particularly by large hauls, e.g. larger than 40 tons, may incur that particularly the lower lying part of the catch is squeezed so that intestines come out, and the cells of the fish' muscular tissue and blood vessels may also be crushed, blood coming out into the muscular tissue. This reduces the quality and the value of a part of the catch and may incur a reduced grade rating of parts of the catch to lower rating, and also incurring a considerable sorting work. The squeezing and crushing of fish, and particularly of intestines, requires a thorough cleanup of the trawl sack and the trawl deck after each hauling.

Some vessel arrangements exist in which this problem is reduced. One solution used during large catches is to bring the trawl sack adjacent to the vessel so that one may pump the fish catch on board by means of a fish pump. This requires the vessel to remain stationary until the trawl sack is discharged, thus the vessel cannot run with a new trawl in the sea before the trawl sack adjacent to the hull has been discharged.

One solution on this problem is presented by Norwegian patent NO 94493 from 1959 granted to engineer Nils Johannes Liaaen from Aalesund, Norway, in which is arranged a frame or extension at the stern end of the trawl slipway, in which the frame constitutes an aperture above the waterline such that a trawl sack or a purse net may be held in a sufficiently expanded position for a scoop net from a crane may be lowered into the net and discharge the trawl sack's contents of fish over to the trawlers cargo compartment. This solution incurs rather slow discharging of the trawl sack and also a stationary vessel during the discharge of the trawl sack.

Norwegian patent 153 212 granted in 1986 to G. R. Delclifford, based on the international patent application PCT/AU80/00068, describes a trawler vessel in which a small trawl is spanned in front of the vessel, with spikes constituted by forward extending inclined rods. The trawl net's rear end constitutes a funnel leading into a longitudinally running continuous tunnel through the vessel in which water and fish passes, but in which the fish is driven up from the tunnel to the deck by means of a conveyor elevator which lets through the water horizontally but which does not let pass the fish above a certain size and transports it up to the deck.

German patent publication DE89769 to William Adam, Scotland, granted by the Kaiserliches Patentamt in 1896, describes also a trawler using an ahead running trawl net leading into the bow of the trailing vessel. The trawl net is towed by two separate auxiliary tender vessels (wheel propulsion steamers), which are running several hundred meters ahead of the trawler and pulls each their extended trawl wire. The fish flows freely into a chamber having an upward inclining strainer plate which lets the water pass down and through the strainer plate and out of the vessel, and the fish is forced up along the strainer plate until it hits a conveyor belt elevator lifting the fish out of the water and up to a deck. Such a solution presented in DE 89769 will inevitably work best in good weather, but hardly during the more prevailing sea states at sea, e.g. along Newfoundland, in the North Atlantic, in the Norwegian Sea, or in the Barents Sea.

British Patent GB 1 555 437 "A fishing vessel especially suitable for fishing in icebound waters", granted, describes a trawler having a narrow, longitudinal recess from the stern and extending in a forward direction a desired length along the vessel's centre axis, so that in fact two parallel extending narrow stems are formed on the vessel. In the forward end of the recess that is between the two stems is arranged a trawl slipway for hauling a trawl net and trawl sack. The trawl slipway may be fixed or made for tilting about a hinge at its forward edge.

There is a need in the fishing industry to have a trawler and a realistic trawling method which facilitates hauling and prevents crushing of the catch, and which is efficient also in harsh weather, e.g. in the Norwegian Sea, The Barents Sea, In Alaska, and in other seas with harsh weather conditions. Reducing the damage to the catch could reduce unnecessary overfishing of the fish resources and also improve the overall quality of the catch. Several of the above mentioned patents would not actually work in normal bad weather with irregular waves having wave height H around 7 meters and a catch of about 50 to 100 tons.

SHORT SUMMARY OF THE INVENTION

The invention is an improvement relative to the mentioned vessels and their ways of trawl fishing, and is a trawling vessel for use with a trawl net for catching marine bio-resources, with a trawl sack attached aft on a trawl net for keeping the catch, said vessel comprising lines for towing and hauling said trawl net and trawl drums for hauling said trawl net The novel features of the invention are as follows:

a lock chamber in a stern of said vessel, said lock chamber having a main portion of its volume below said design water line of said vessel, said lock chamber being arranged for hauling said trawl sack with the catch from the sea, through a sluiceway in said stem, and said lock chamber being arranged for discharge of said trawl sack and for temporarily keeping said catch; and a trunk channel leading up from said lock chamber and being arranged so that said trawl sack, in a generally discharged state, may be hauled up through said trunk channel to a deck, thereby leaving said catch in said lock chamber.

According to an advantageous embodiment of the invention there is a pulling line arranged for being attached in a forward or aft end of the trawl sack, and arranged for hauling the trawl sack into the lock chamber.

According to an additionally preferred embodiment of the invention the vessel's lock chamber is provided with a forward trunk channel leading from a forward end of the lock chamber and arranged in a way that the trawl sack and possibly the entire trawl net, in a discharged state, may be pulled up through said forward trunk channel, preferably to a trawl deck. The pulling line is arranged for being extended from a net drum arranged on the trawl deck, preferably through the forward trunk channel and through the lock chamber.

According to a preferred embodiment of the invention the vessel is provided with an auxiliary aft trunk channel, also being a channel, but leading up from the opposite, aft end of the lock chamber and arranged in a way that the entire or an aft part of the trawl sack in a generally discharged state may be pulled up through the aft trunk channel, preferably by means of an aft net drum.

According to the preferred embodiment of the invention, the pulling line is be arranged for being extended from the net drum, down through the forward trunk channel and through the lock chamber, and out back through the sluiceway. According to the preferred embodiment there is arranged a conveyor band for the pulling-line along a recess rail between the upper mouth of the forward trunk channel and through the lock chamber to guide the pulling line from aft to be attached to the trawl before hauling the trawl in through the sluiceway. This conveyor band may end up adjacent to a corresponding pulling line vertical conveyor band at the stem to bring the pulling line up to deck level for being attached to the trawl before hauling.

According to a preferred embodiment of the invention, the vessel has a forward trunk channel leading up from a forward end of said lock chamber and arranged so that said trawl sack, in a generally discharged state, may be hauled up through said forward trunk channel to a deck, leaving said catch in said lock chamber.

According to a preferred embodiment of the invention the vessel has trawl winches for said lines for towing and hauling said trawl net.

According to a preferred embodiment of the invention said lines are port and starboard lines, said lines provided with port and starboard trawl doors arranged on said port and starboard ancillary lines respectively, for spreading port and starboard front ends of said trawl net.

According to a preferred embodiment of the invention, said mainly water-filled lock chamber is arranged for hauling said trawl net in addition to said trawl sack with the catch, from the sea, through said sluiceway to said lock chamber. There may be arranged a widened upper mouth of said trunk channel for facilitating using either starboard or port trawl winches for hauling said net or said trawl sack.

According to the preferred embodiment of the invention, said lock chamber ceiling covers generally all of said lock chamber, said forward trunk channel running through said ceiling.

According to a preferred embodiment of the invention, said sluiceway is also arranged mainly below said vessel's design water line in said stem. There may be arranged a lock gate for closing and opening said sluiceway.

FIGURE CAPTIONS

The invention is illustrated in the accompanying figures, which are meant for illustrating the invention only, and which may not be construed as limitations to the invention, which shall be limited by the attached claims.

FIG. 1a illustrates a vessel according to the invention in a vertical partial section end view and partially in an end elevation view of the stern part of the vessel, and shows an outline of a sluiceway in the transom plate of the trawler, said sluiceway leading forward to a lock canal and to a lock chamber.

FIG. 1b illustrates a vertical transverse section slightly aft of line B in the longitudinal section in FIG. 1e, through a lock canal extending from the sluiceway in the transom stern to the main body of the lock chamber.

FIG. 1c is a vertical transverse section at line C of FIG. 1e, illustrating the enlarged cross-section of the lock chamber.

FIG. 1d is a vertical transverse section further ahead at line D also including the forward trunk channel.

Figure 3:
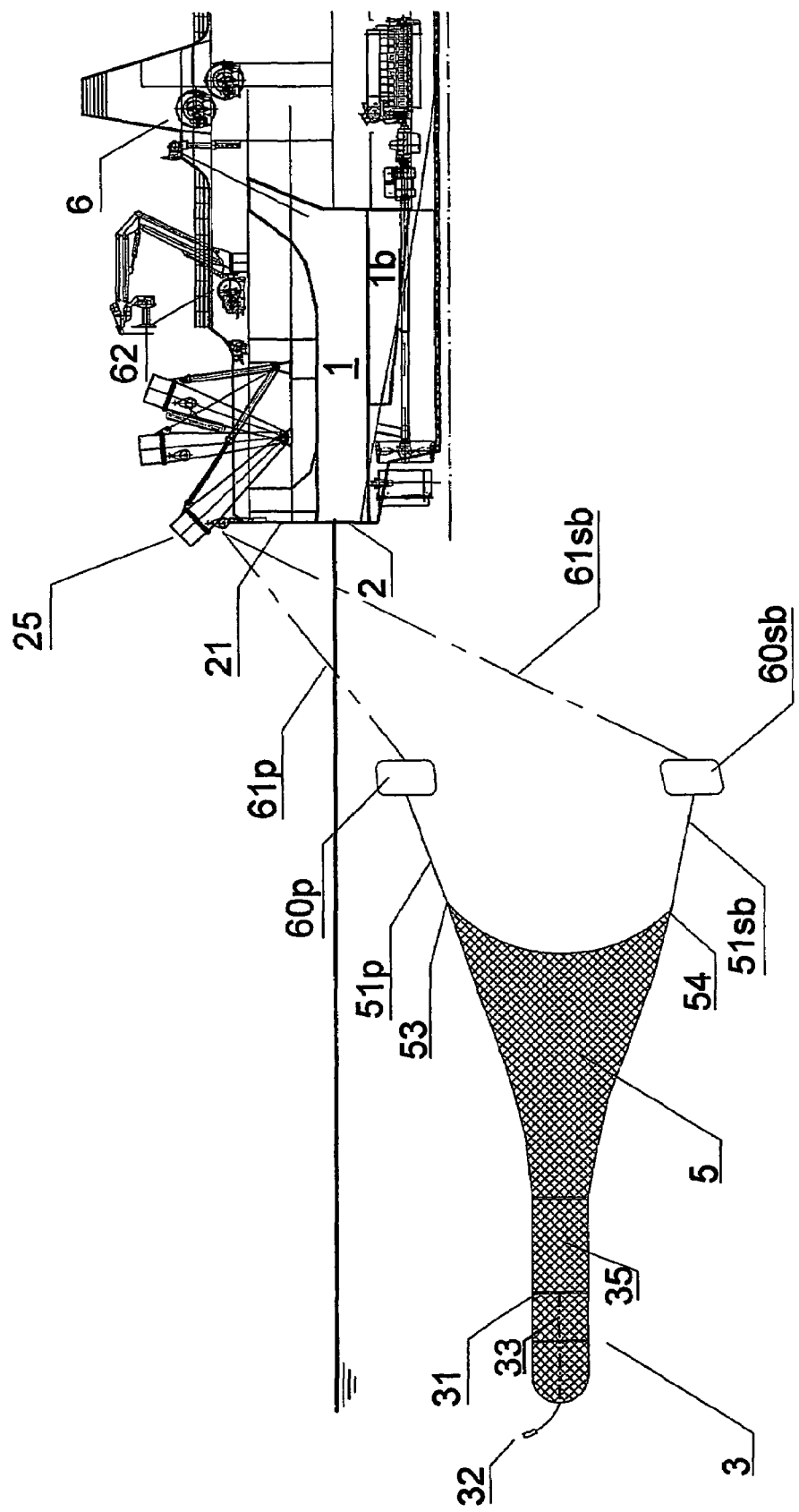

FIG. 3 illustrates a longship vertical section and a side elevation view of the stem of a trawler vessel according to the invention, with a trawl comprising a trawl sack, a trawl sack extension and a trawl net with trawl doors in operative positions. The trawl doors normally operate at approximately equal submergence depths, and are only illustrated in a somewhat distorted oblique elevation view of the submerged equipment to facilitate the understanding of the trawl. An actual entire trawl layout is also much larger than illustrated. The trawl and the trawl doors are also somewhat tilted over to the side, and the trawl is illustrated in a miniature view.

Figure 4:
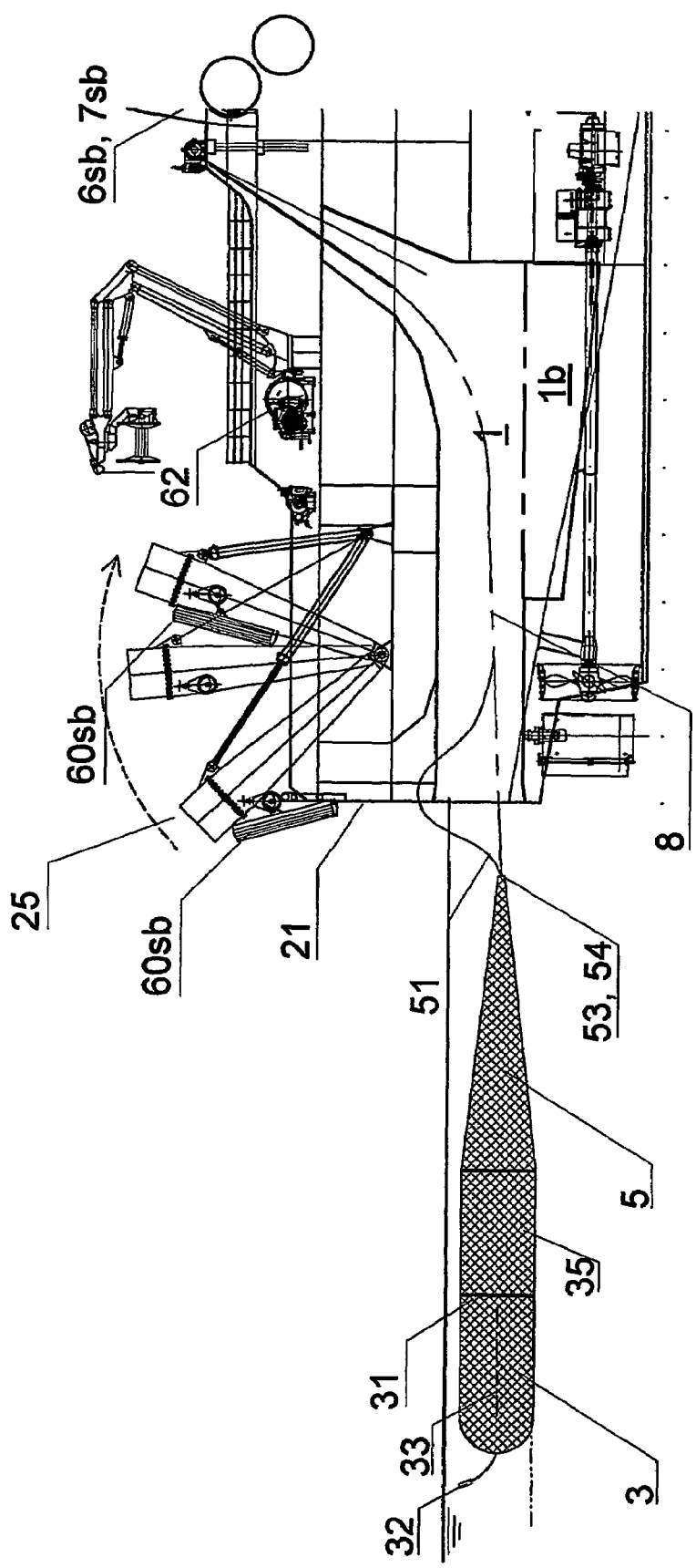

FIG. 4 illustrates, in more enlarged view of the stem of the ship, a vertical section and a side elevation view of the stern of the vessel according to a preferred embodiment of the invention in which the trawl wires are hauled in over trawl winches to the trawl deck, just before the trawl net and the trawl sack, preferably with a trawl sack extension, may be disconnected from the trawl wires and attached to a pulling line, before the pulling line is dropped and the trawl net, the trawl sack and the trawl sack extension may be hauled in through the sluiceway to the lock chamber.

Figure 5:
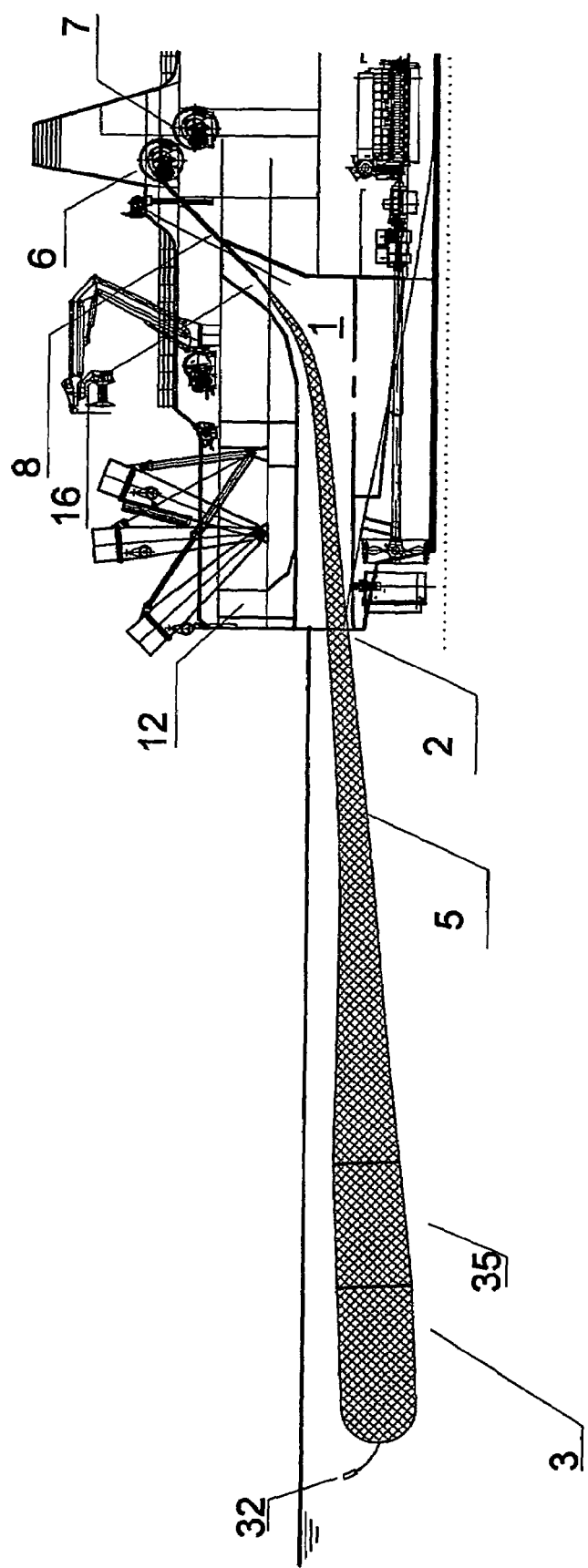

FIG. 5 is the same vertical section as FIG. 4 of the stem, and illustrates how the pulling line attached to the front end of the trawl net is dropped from the deck and ready to enter the sluiceway, whereby the trawl net, the trawl sack extension and the trawl sack itself may be hauled in through the sluiceway. Alternatively, but less preferred, the net may be hauled in over the roller at the stem or a trawl slipway, and only the trawl sack possibly with the trawl sack extension pulled in through the sluiceway to the lock chamber.

Figure 6:
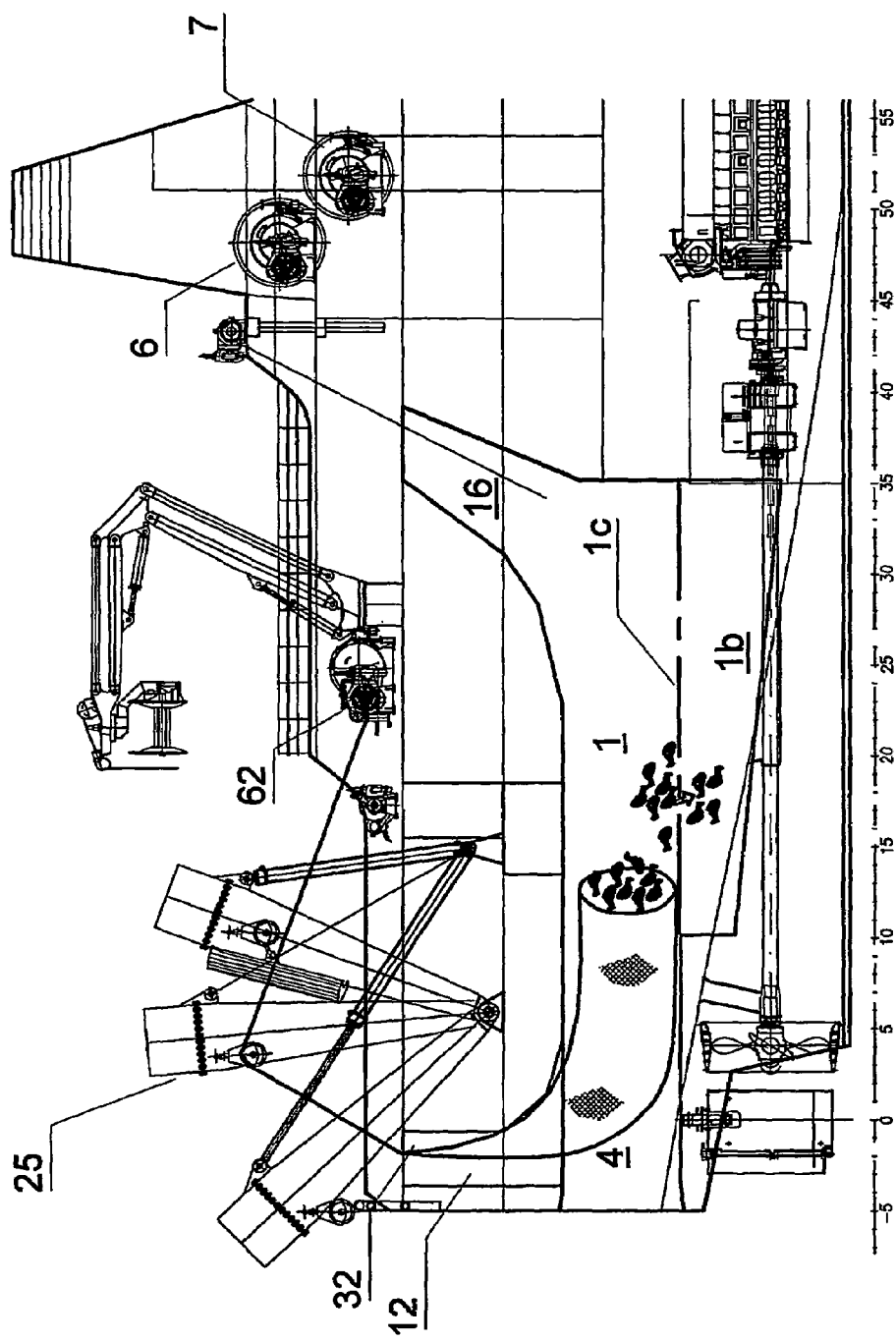

FIG. 6 is the same vertical section as FIG. 5, and illustrates the aft end of the trawl sack after having been pulled entirely into the lock chamber, before the trawl sack according to an alternative preferred embodiment of the invention is split, possibly that the trawl sack extension is disconnected from the trawl sack and the forward part of the trawl sack or the trawl sack extension is pulled off the catch, and in which the trawl sack is prepared for being pulled up through an aft trunk channel to a net winch on deck.

Figure 7:
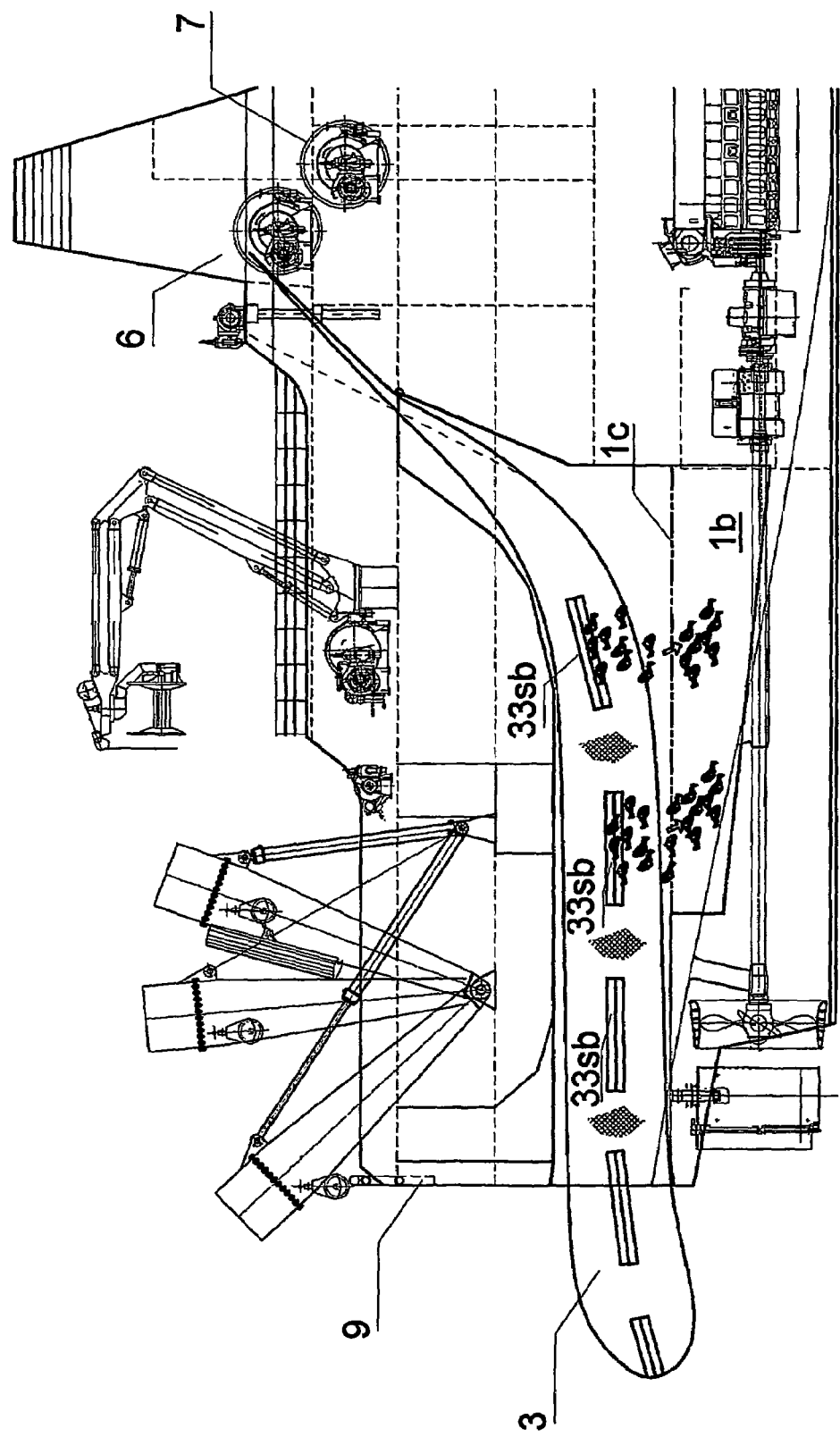

FIG. 7 is in the same vertical section of the vessel as above, and illustrates that the trawl sack has been split and opened, here illustrated as opened along zips in the sides of the trawl sack while the trawl sack extension is hauled up through the forward trunk. There may also be arranged an aft zip in the aft end of the trawl sack. The fish is pumped out of the lock chamber by means of a fish pump, to e.g. a storage-room or for refining on board the vessel.

Figure 8:
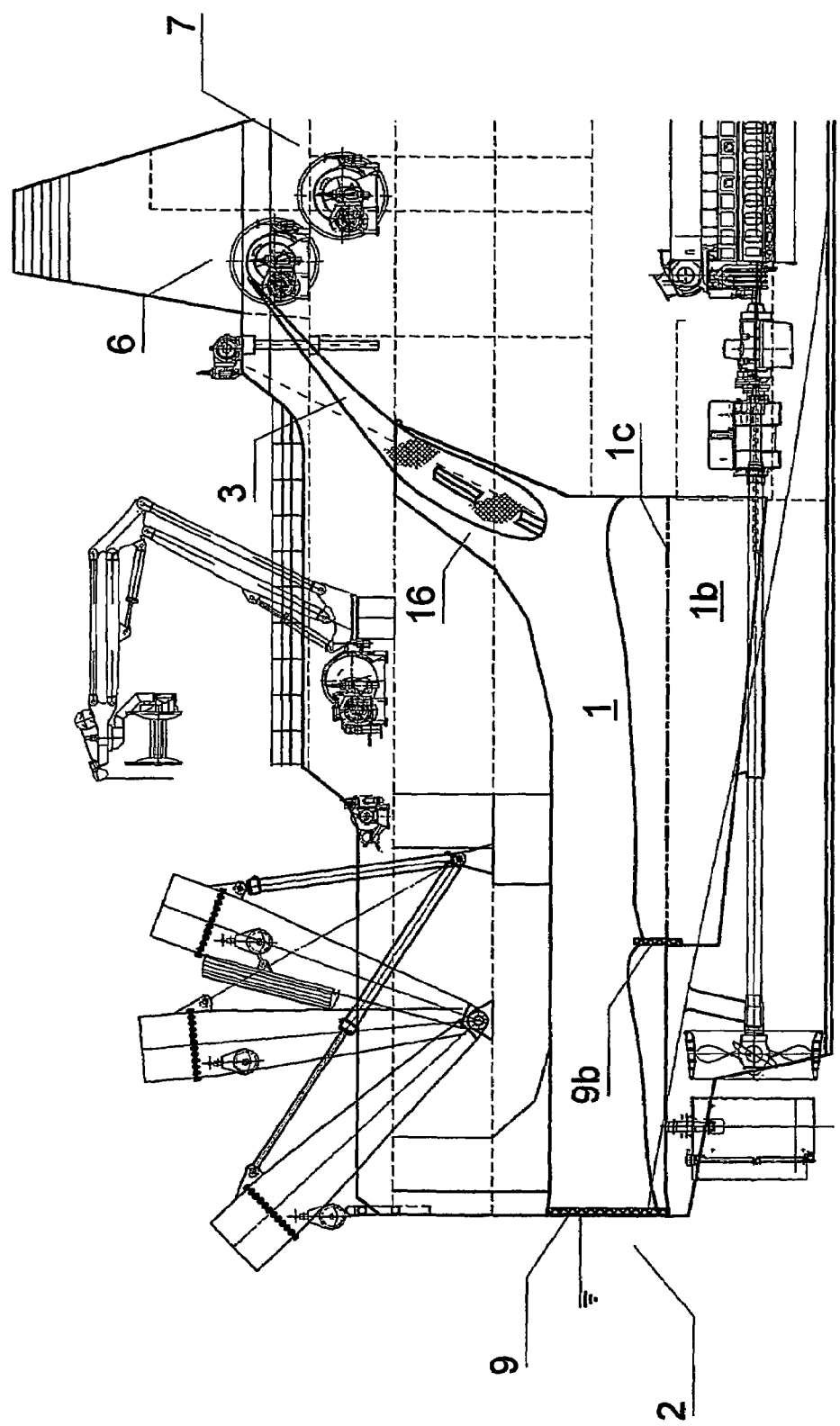

FIG. 8 illustrates a vertical section through the centre plane in the stem of a possible embodiment of the vessel, in which a ceiling of the lock chamber is situated above the vessel's design waterline. Also shown is the lock gate and a baffle plate to prevent sloshing.

Figure 9:
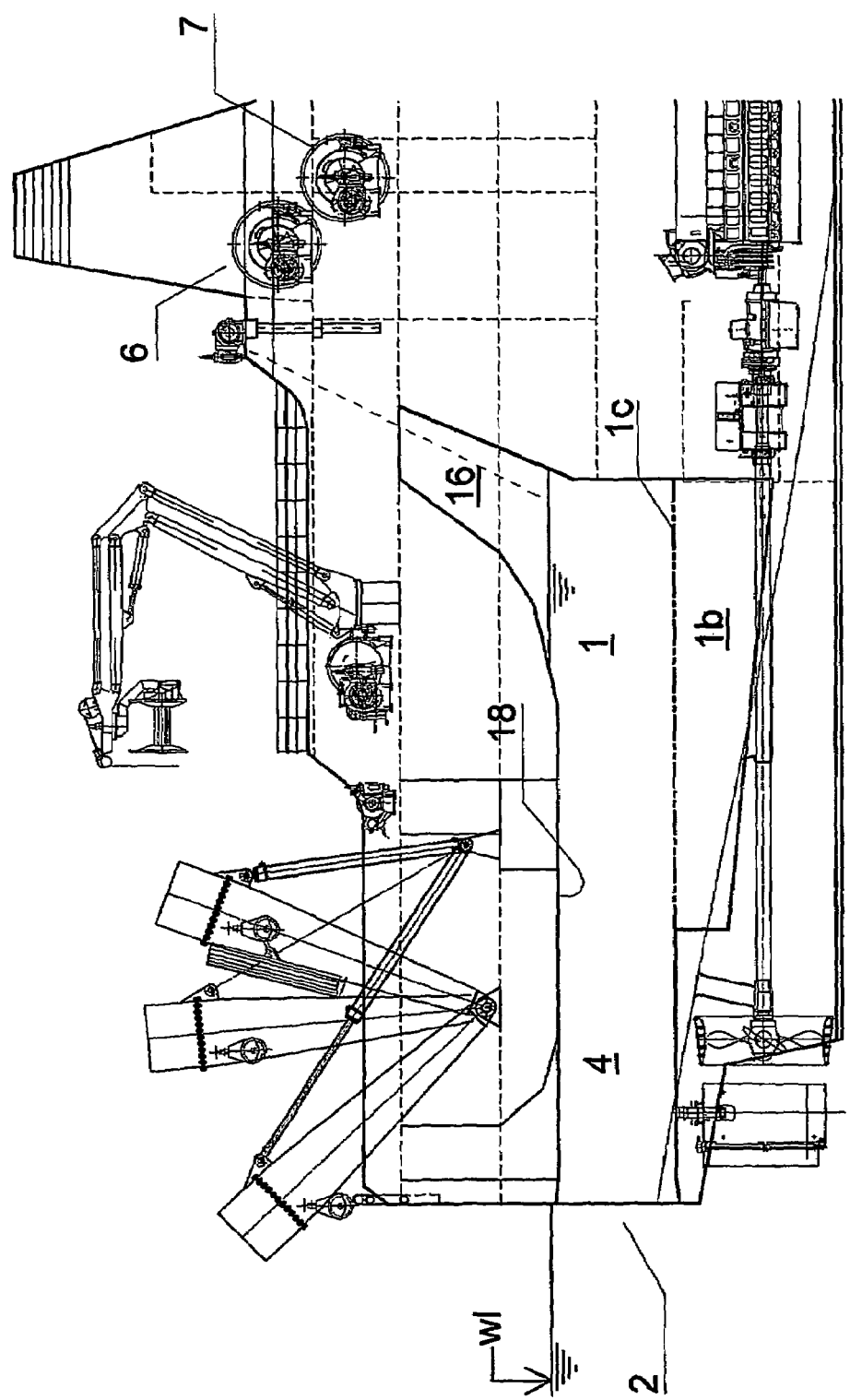

FIG. 9 illustrates a vertical section of the vessel, in which a ceiling in the lock chamber is arranged generally below the vessel's design waterline in order to prevent formation of a free surface on the water inside the lock chamber.

Figure 2:
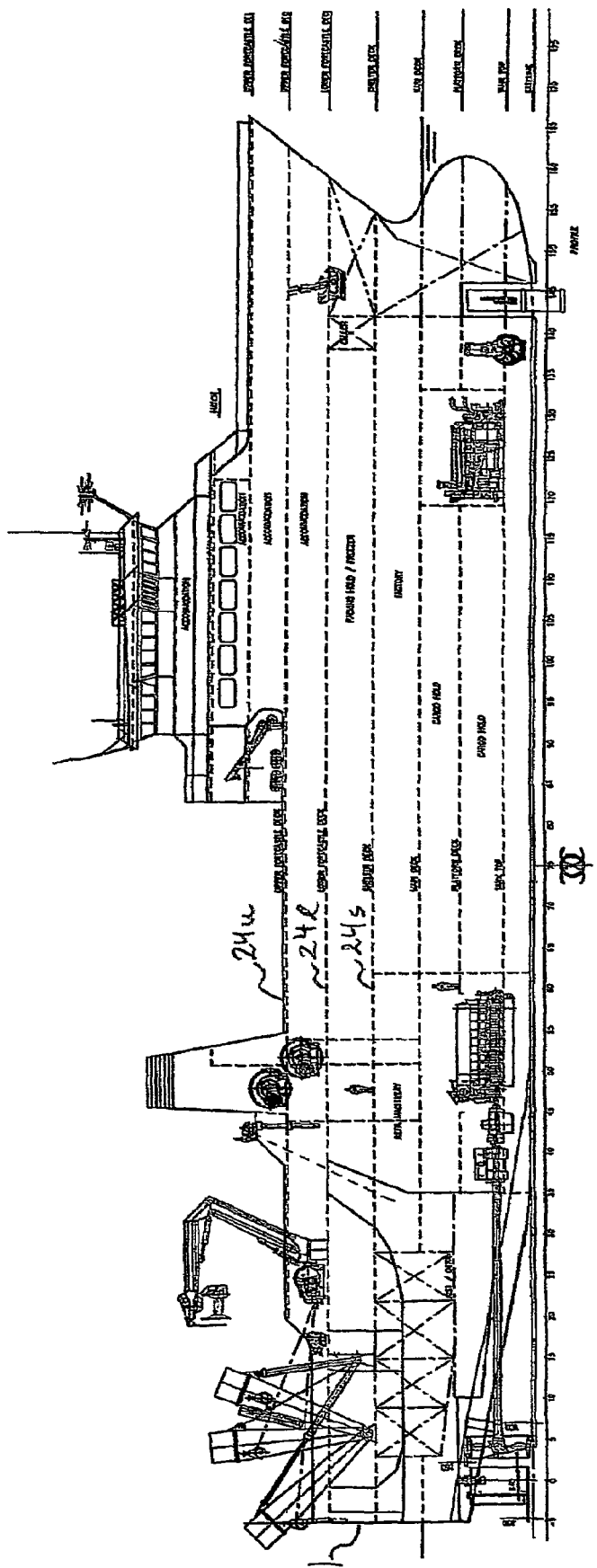
FIG. 2 illustrates in a side elevation view and a longship vertical section along the centreline plane of the vessel, and particularly a lock chamber's longitudinal section, and particularly also trawl decks or forecastle decks and shelter deck with equipment like trawl winches and trawl drums.

FIGS. 10a to 10f shows horizontal sections with deck arrangements of the stern end of the vessel, all of which can be recognized in the longitudinal section of FIG. 2.

Figure 10A:
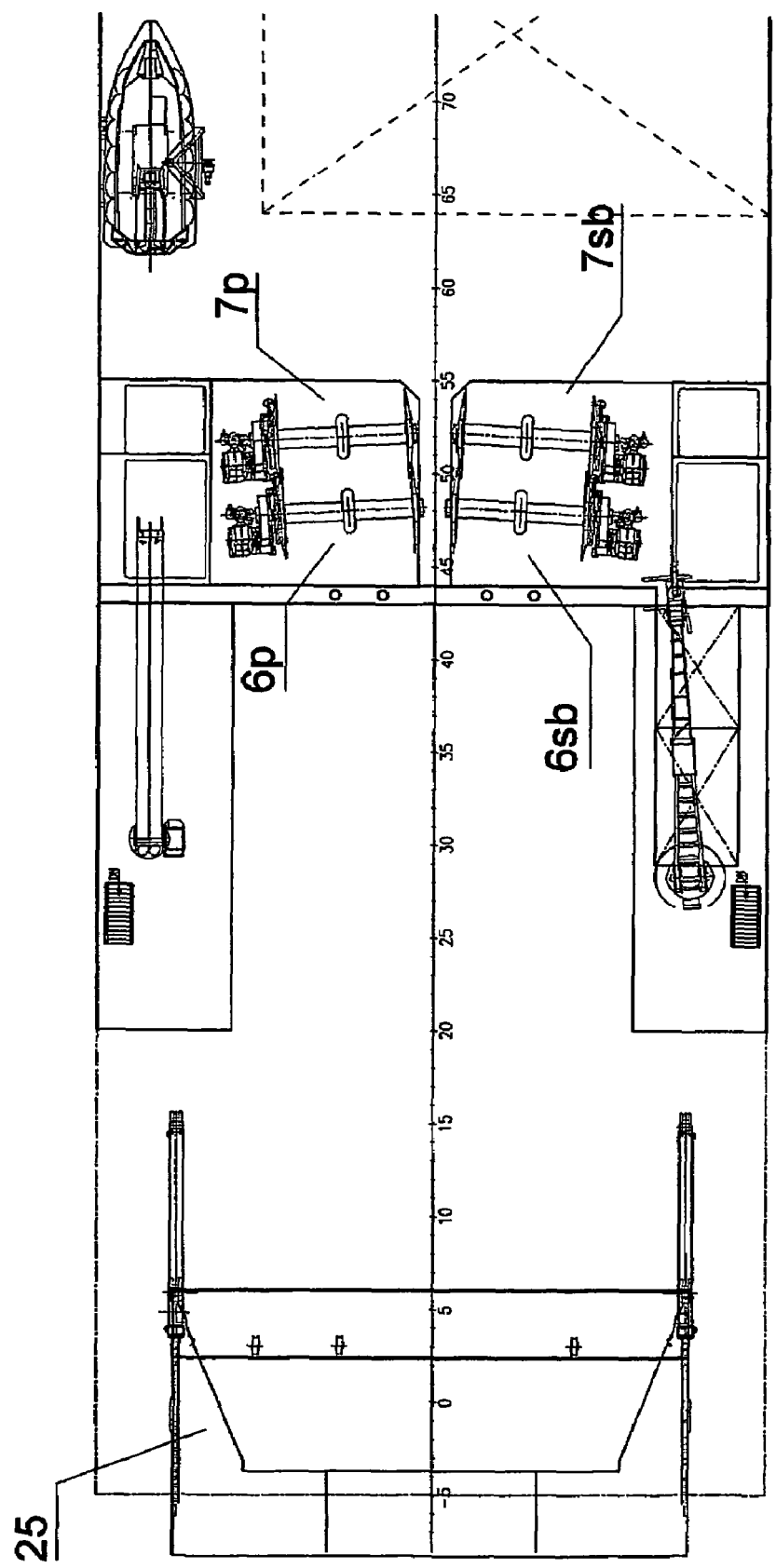

FIG. 10a shows an upper forecastle deck with trawl drums and the top of a transverse gallows crane at the stern.

Figure 10B:
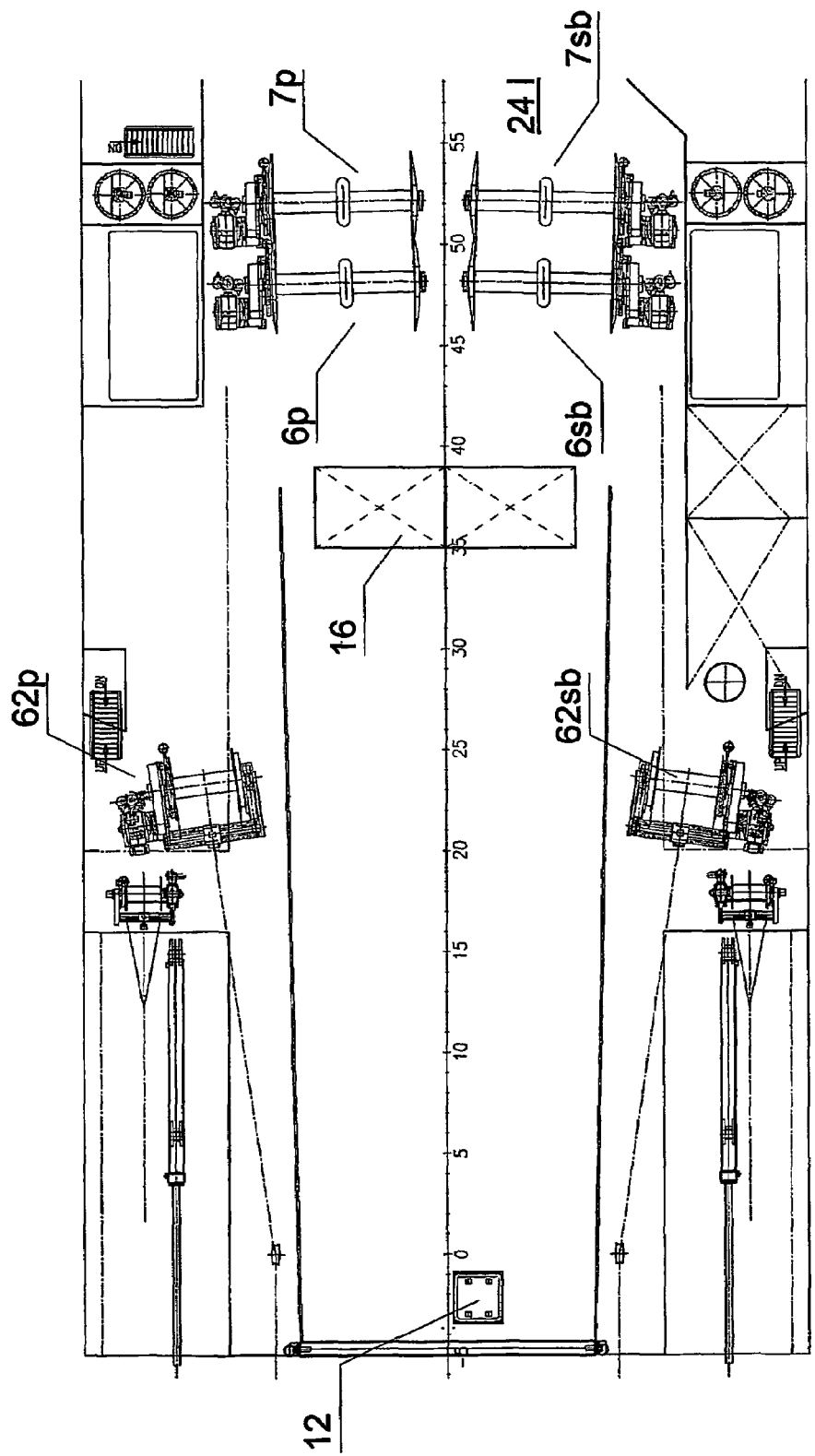

FIG. 10b is the lower forecastle deck, with trawl drums (also shown in FIG. 10a), and trawl winches and the upper mouths of the forward trunk channel, the aft trunk channel and an inspection trunk channel, and a trawl net ejection roller at the stern. Please note the wide upper mouth of the forward trunk channel.

Figure 10C:
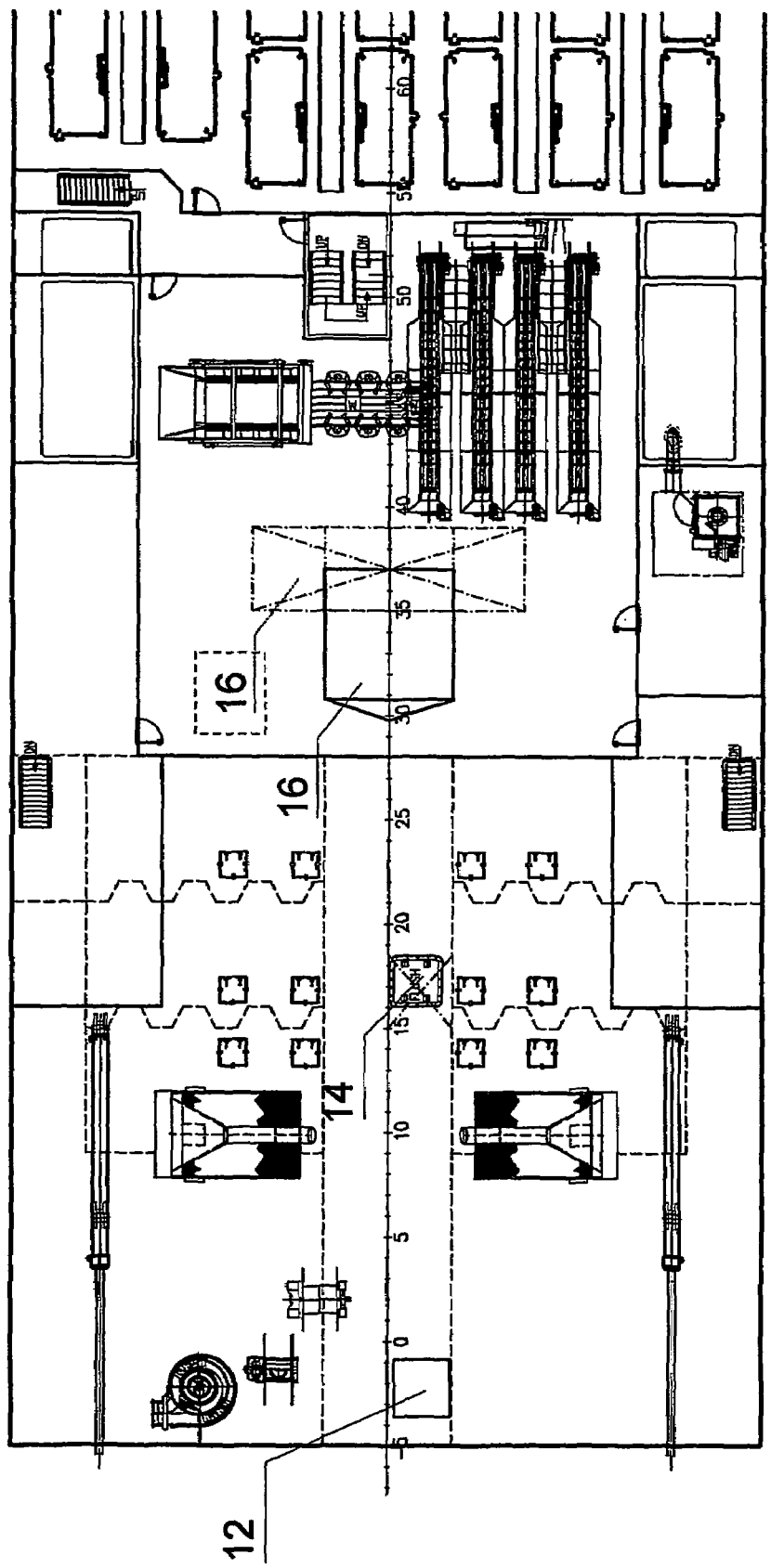

FIG. 10c shows the shelter deck with the vertically passing forward and aft trunk channel.

Figure 10D:
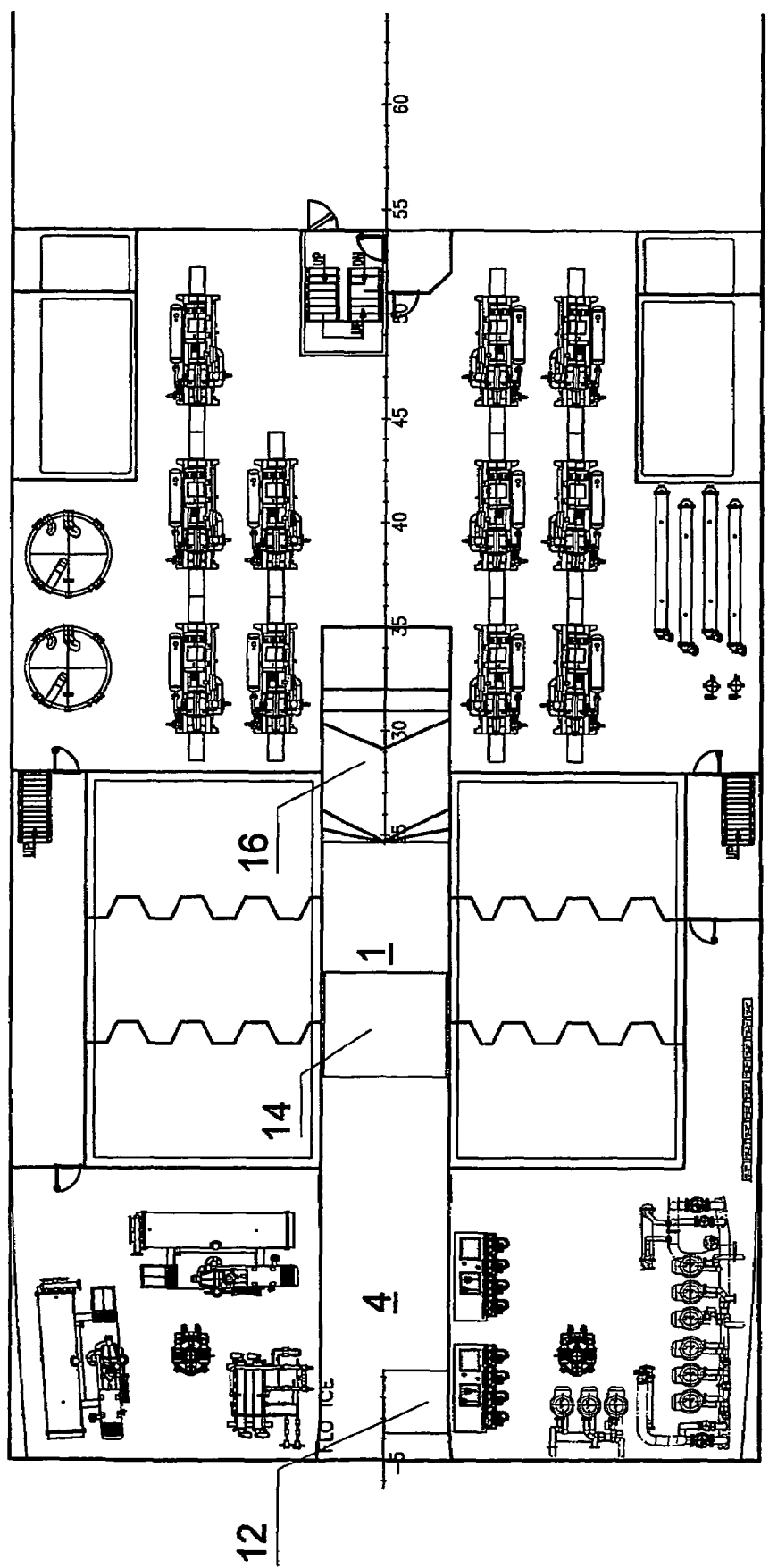

FIG. 10d shows the main deck with the top of the lock chamber with the lock canal and the sluiceway at the stem end, and the lower mouths of the forward and aft trunk channel.

Figure 10E:
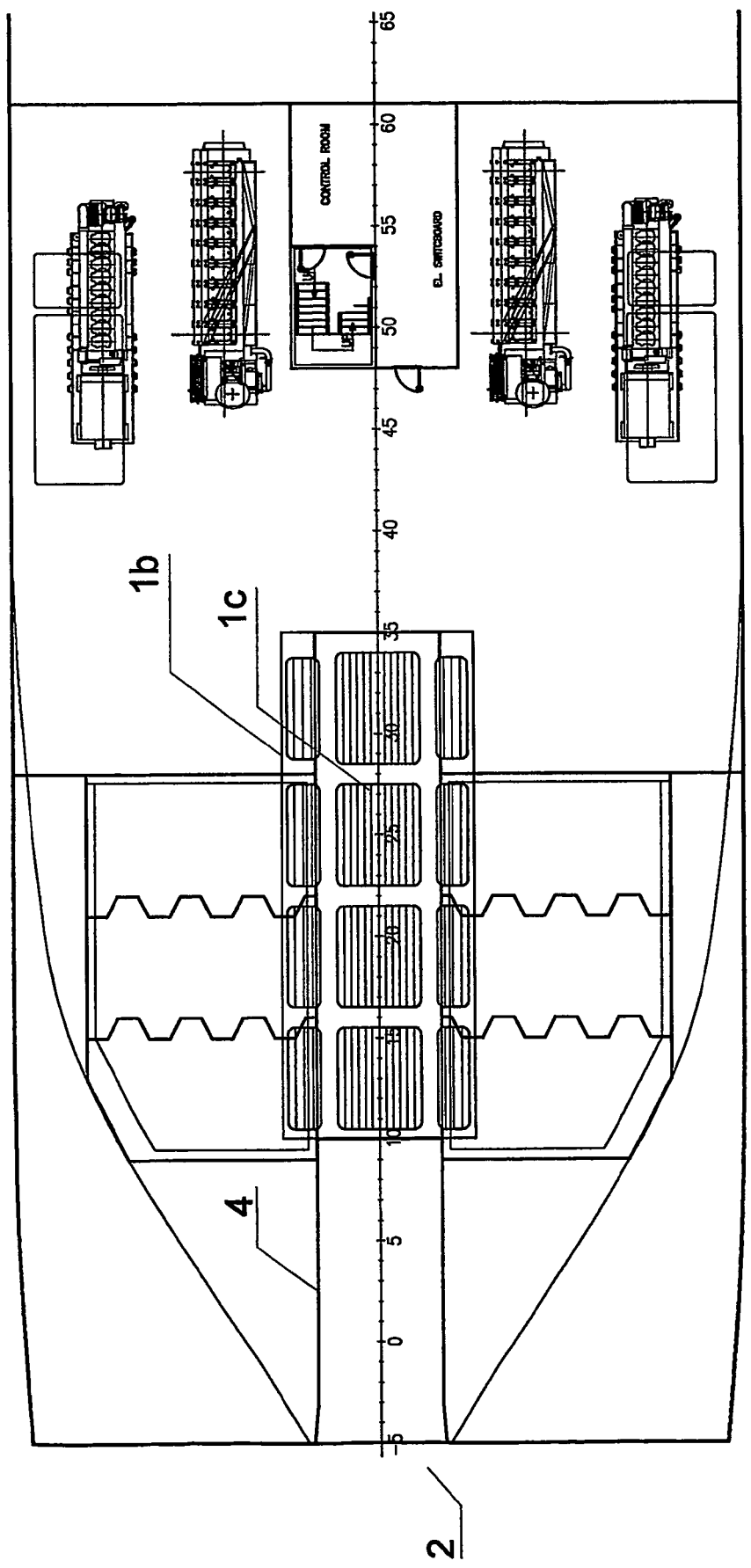
Figure 10F:
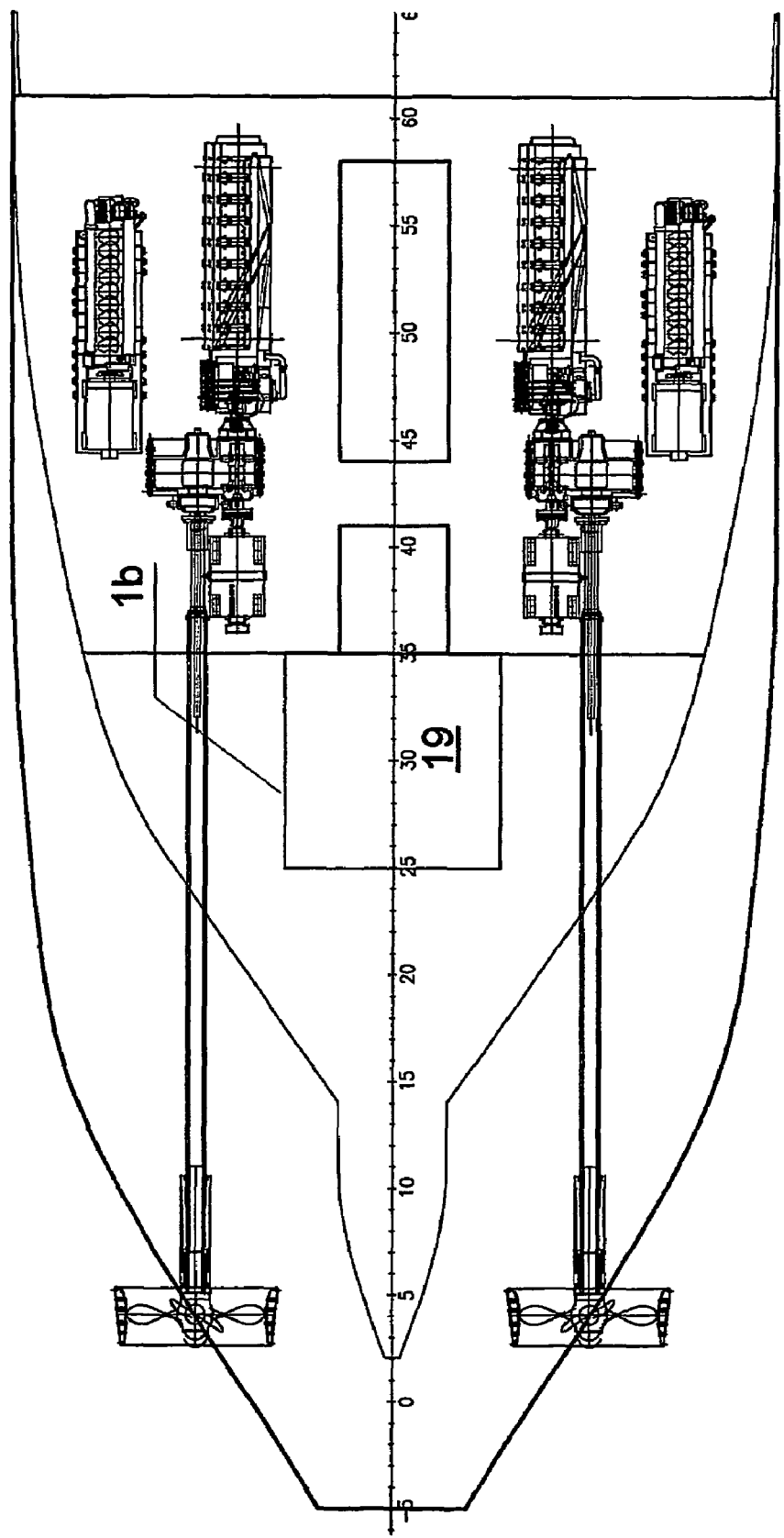

FIG. 10e shows the platform deck with the lower portion of the sluiceway, the lock canal and the widened lower portion of the lock chamber that is horizontally divided by a large grating to let pass the catch down to the lower portion of the lock chamber.

Figure 11:
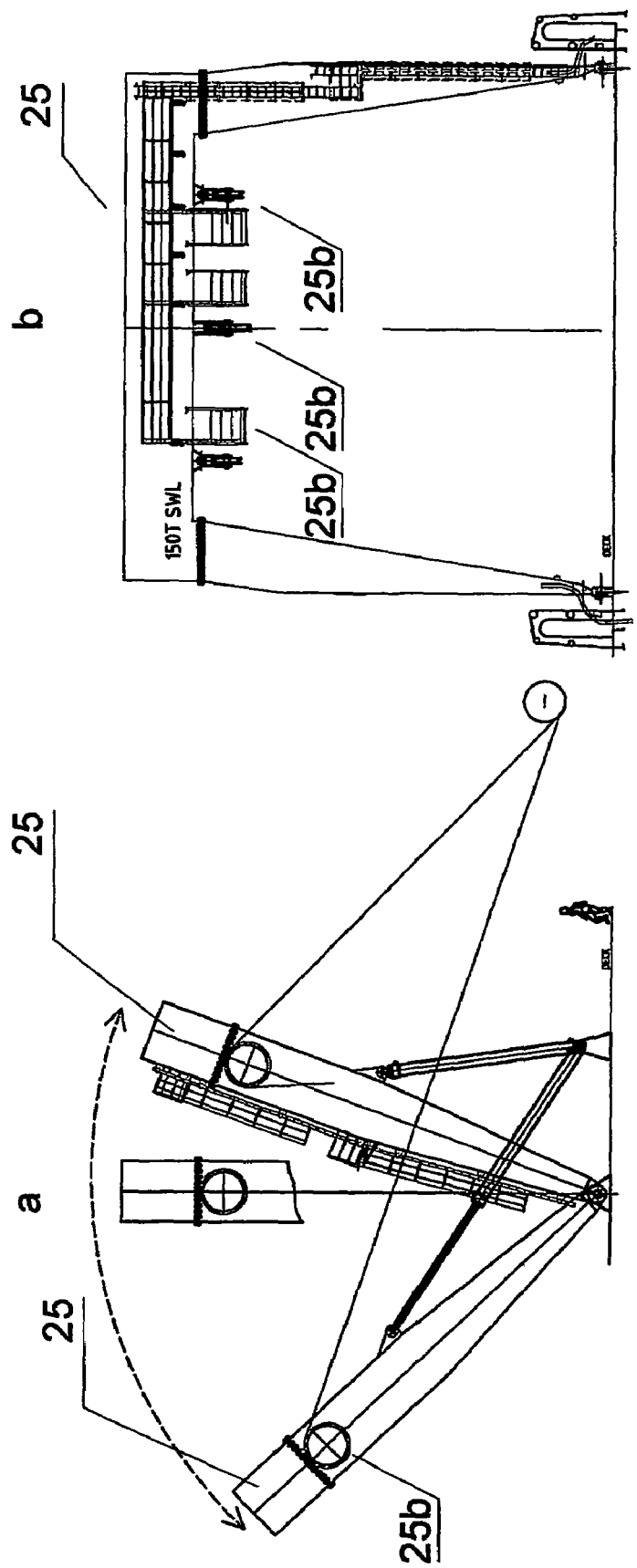

FIGS. 11a and b illustrate a side elevation view and an end elevation view of the stern gallows crane.

DETAILED DESCRIPTION OF A PREFERRED EMBODIMENT OF THE INVENTION

Below is given a more detailed description of a vessel according to the invention, with reference to the attached Figures. FIG. 1 illustrates a vessel according to the invention with a vertical partial section, partial end elevation view of the stern of the vessel. The vessel is provided with a trawl net (5) for catching marine bio-resources, with a trawl sack (3), also called a "cod end", attached aft on said trawl net (5) for keeping said catch. The vessel is provided with trawl winches (62) for port and starboard trawl wires or ancillary lines (51sb, 61sb, 51p, 61p) for towing and hauling said trawl net (5), preferably with port and starboard trawl doors (60sb, 60p) arranged on said port and starboard ancillary lines (51sb, 61sb, 51p, 61p) respectively, for spreading port and starboard front ends (53, 54) of said trawl net (5). The vessel has large trawl drums (6, 7) for ejecting and hauling said trawl net (5). The trawl drums of the preferred embodiment may have a pulling force capacity of 50 to 70 tons. In the preferred embodiment of the vessel, starboard and port trawl drum (6sb, 6p, 7sb, 7p) are arranged preferably on an upper or lower forecastle deck (24u, 24l), (see FIGS. 2, 3, and 4). Having a pair of trawl drums is for enabling hauling one trawl net onto one drum and ejecting another net from the other trawl drum simultaneously. Starboard and port trawl winches (62sb, 62p) are in the preferred embodiment arranged on the lower forecastle deck (24l). A trawl slipway is no longer strictly necessary in the preferred embodiment of the invention. For ejecting a trawl sack and a trawl net, these are guided from the trawl drum (6, 7) and aft under a transverse bar (20a) and over a transverse roller (20b) in deck level at the top of the transom stem (21). The transverse bar (20a) prevents the outgoing net from "dancing" above the deck while the stem drops due to the vessel's pitching, and the roller assures a smooth passage for the net.

Figure 1E:
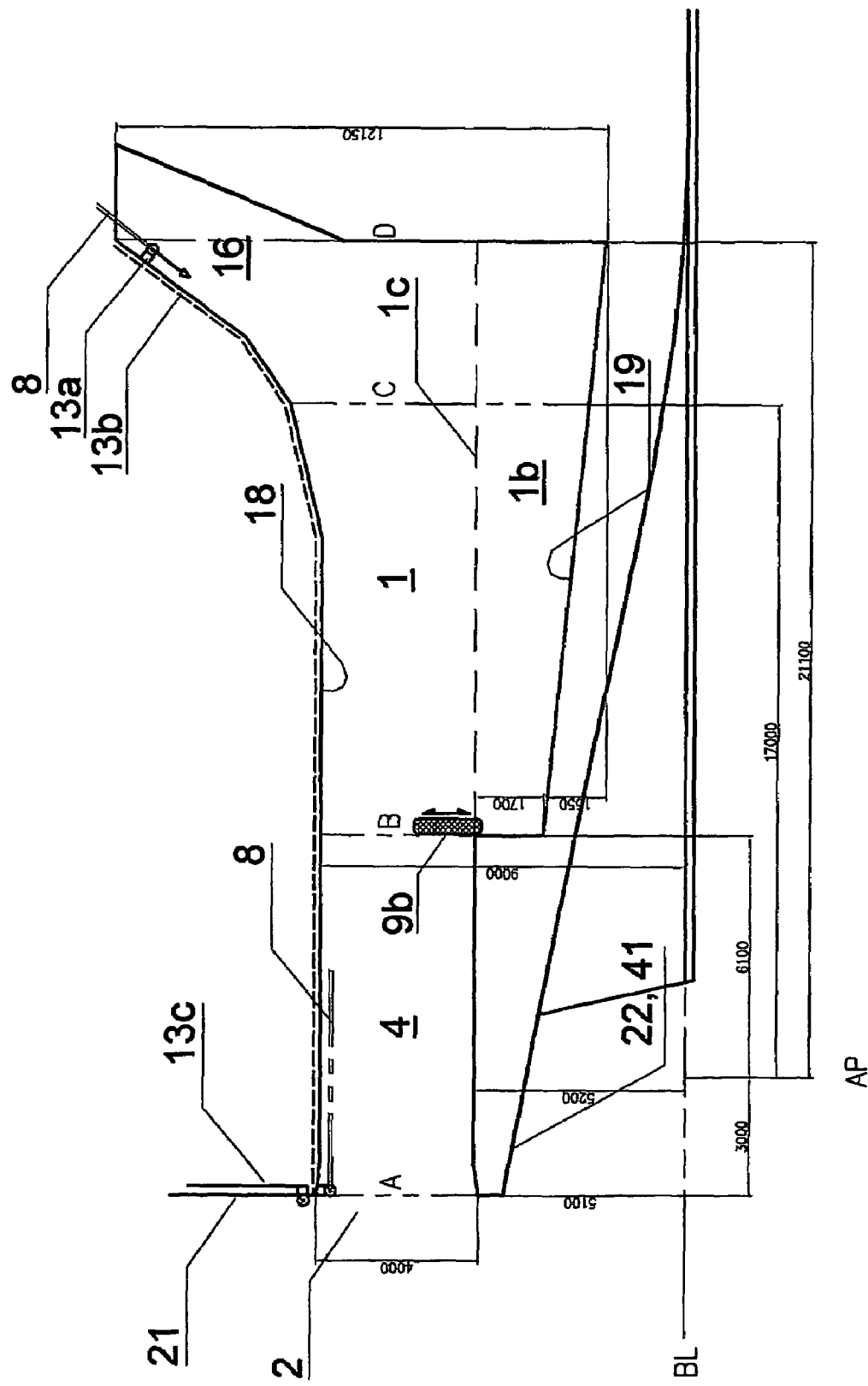
FIG. 1e is a longitudinal section through the lock chamber of the invention.

FIG. 1b illustrates a vertical transverse section slightly aft of line B in the longitudinal section in FIG. 1e, through a lock canal (4) extending from the sluiceway (2) in the transom stern (21) to the main body of the lock chamber (1). The volume capacity of the lock chamber (1) may be to hold a trawl sack containing about 100 tons of fish.

FIG. 1c is a vertical transverse section at line C of FIG. 1e, illustrating the enlarged cross-section of the lock chamber here with a lower sump part (1b) below a grating (1c). The capacity of this lower sump part is in the preferred embodiment of the invention between 50 and 150 tons, but depends on the general size of the trawl sack and the ship.

FIG. 1d is a vertical transverse section further ahead at line D also including the forward trunk channel (16). Note particularly the widening at the upper mouth of the trunk channel which facilitates using both starboard and port trawl winches (6sb, 7sb, 6p, 7p) alternately for hauling the net and the trawl sack.

FIG. 3 illustrates the vessel with a trawl net in the sea, e.g. while hauling the trawl for bringing the catch onto the ship. The trawl is pulled after the ancillary lines (51, 61) and starboard and port trawl doors (60sb, 60p) spreading the trawl net, and with a trawl sack (3) attached on the trawl net (5) for keeping the catch. According to a preferred embodiment of the invention there is arranged a trawl sack extension (35) between the trawl net (5) and the trawl sack (3) in order for the trawl sack extension taking the load on the drum (6) on hauling of the catch. According to the invention, the vessel is provided with at least one lock chamber (1) for the trawl sack (3), said lock chamber having a large part of its contained water volume arranged generally below the vessel's waterline, for hauling and temporary holding the trawl sack (3) with the catch. There is arranged a sluiceway (2) between the lock chamber (1) and the sea, with the sluiceway (2) also arranged mainly below the vessel's waterline. A lock chamber ceiling (18) covers generally all of said lock chamber (1). In the preferred embodiment of the invention, the lock chamber (1) is divided by a nearly horizontal grating (1c) having grate openings sufficiently large for letting through desired fish sizes, but small enough to stop sharks and undesired larger items like rocks, timber and the like. Below the grating (1c) is a widened intermediate lock chamber storage sump (1b) for the catch. The fish is pumped out of the lock chamber storage sump (1b) by means of a pump.

FIG. 2 shows a longship vertical section through the centre plane and a side elevation view of the vessel, and shows the lock chamber's longitudinal section. The previous preferred invention included a trawl slipway which has now been discarded. The forecastle decks carry equipment like trawl winches (62) and trawl drums (6, 7). There is also drawn a shelter deck (24s) indicated by a broken line below the forecastle decks. According to a preferred embodiment the sluiceway (2) arranged in the vessel's transom plate (21). In an additionally preferred embodiment, the sluiceway (2) is arranged near the vessel's centreline in the transom plate (21) as illustrated in the enclosed drawings. Thus the vessel may maintain a slender stern part that will thus easily let the sea pass along and create little wake while running through the sea. One may also imagine alternative vessel embodiments having one or two sluiceways (2) arranged in the vessel's starboard and port sides ([23] 22) respectively of the transom plate (21), or both.

According to a preferred embodiment of the invention the vessel is equipped with a lock gate (9) that may close and open the sluiceway (2). The sluiceway may according to a preferred embodiment be rounded towards the transom stem, the edge having a radius of about 0.5 m. The lock gate (9) protects the lock chamber against intrusion of waves from the aft direction. Waves from the aft direction might otherwise force water up through apertures (explained below) between the lock chamber and the trawl deck. Additionally, it is advantageous to be able to close the sluiceway to protect the catch from wave action while the catch has been pulled into the lock chamber. The trawl sack may have a diameter of, say, 2.8 meters, and the sluiceway (2), which may be six-sided as illustrated in FIG. 1a, may have a somewhat larger sidewards width of about 3.4 meters, which allows water to flow out of the lock chamber outside of the trawl sack while the trawl sack is hauled in.

In a preferred embodiment the vessel is provided with a lock chamber ceiling (18) covering generally the entire lock chamber (1) except for the trunk channels, se FIGS. 1 to 9. The lock chamber ceiling (18) distinguishes the lock chamber from being a simple unprotected trawl sack dock, and reinforces the stem part of the vessel. The lock chamber ceiling also assures that one may have a continuous trawl deck above the lock chamber. The lock chamber ceiling (18) and the continuous trawl deck (10) enables the stem part of the vessel to avoid unnecessarily being divided or split and incurring reduced strength, thus maintaining the mechanical strength of the deck portion of the stem portion of the vessel in that a metal skin is present and continuous around the cross-section of the vessel in essentially the entire length of the vessel, also in the stern portion. In one possible alternative embodiment of the invention a portion of the lock chamber ceiling (18) is arranged to reside below the vessel's waterline, see FIG. 9, so that no free surface of any essential size is formed on the water inside the lock chamber (1), with the result that waves in the lock chamber (1) are attenuated. In the previous embodiment of the invention, having a submerged ceiling (18), a free surface is avoided in the major portion of the lock chamber (1), waves which otherwise might be formed in a water mass inside the vessel, such waves having unpredictable behaviour. Such waves having a free surface will under given actions from surface waves of the sea and the vessel's movements like roll, pitch, yaw, and gear, may reinforce and worsen these movements. Tanks are often provided with longitudinal and transversal baffle plates was imagined to be impossible in the previous embodiment of the invention, but such a baffle plate (9b) has now been arranged in the lock chamber, see the description below and also in FIG. 1e.

In a preferred embodiment of the invention the vessel is provided with a pulling line (8) arranged for being attached to the forward ends (53, 54) of the trawl net (5), see FIG. 4, when the starboard and port trawl lines (61sb, 61p) and the trawl doors (60sb, 60p) have been hauled in and lifted out of the water.

The pulling line (8) may according to a preferred embodiment of the invention be arranged for being extended from the net drum (6sb, 6p, 7sb, 7p), down through the upper mouth of the forward trunk channel (16), through the lock chamber (1). According to the preferred embodiment there is arranged a conveyor band (13a) for the pulling-line along a recess rail (13b) along the lock chamber ceiling (18) from the upper mouth of the forward trunk channel (16) and through the lock chamber (1) and the sluiceway (2) to guide the pulling line (8) to be attached to the trawl (5, 3) before hauling the trawl in through the sluiceway (2), see FIG. 1e. This conveyor band may (13a) end up adjacent to a corresponding pulling line vertical conveyor band (13c) arranged from deck level down to the sluiceway (2) at the transom stem (21) to bring the pulling line up to deck level for being attached to the trawl (5, 3) before hauling, or the recess rail (13b, 13c) may be continuous.

In the preferred embodiment of the invention the trawl net (5), and the trawl sack extension (which is not strictly necessary) with the trawl sack (3) are then arranged for being hauled into the lock chamber (1), see FIG. 4 and then FIG. 5. This pulling line (8) is first illustrated in FIG. 4. The duct called a forward trunk channel (16), see FIG. 1e, leads up to an open deck, e.g. a lower forecastle deck (24l), see FIG. 2, from a forward end of the lock chamber (1) and is arranged such that the trawl net and the entire or the forward part of the trawl sack (3, 31), in a generally discharged state, may be hauled up through the forward trunk channel (16). Preferably the trawl net (5) and the trawl sack (3) are hauled to the net drum (6, 7) on an open deck (24), either an upper forecastle deck (24u) or said lower forecastle deck (24l). In the most preferred embodiment of the invention the pulling line (8) is arranged for being extended from one of the net drums (6, 7) arranged on a forecastle deck (24), preferably through the forward trunk (16), and through the lock chamber (1).

An alternatively preferred embodiment of the vessel according to the invention is provided with a corresponding aft trunk (12) leading up from near an aft end of the lock chamber (1), preferably from the lock canal (4). In the preferred embodiment of the invention, this aft trunk (12) is given a minor role and is arranged mostly above the starboard side of the lock chamber or lock canal (4), as seen in FIGS. 10b, 10c, and 10d. The aft trunk (12) is arranged for pulling the entire or and aft part of the trawl sack (3, 32) in a discharged (or mostly discharged) state up through the aft trunk (12), preferably by means of an auxiliary net winch (71) arranged on the lower forecastle deck (24l) where the aft part of the trawl sack is wound up or preferably guided forward to the net drum when turned back-and forth again. This alternative preferred embodiment of the vessel and the method according to the invention is illustrated in FIG. 6. In the previous most preferred embodiment the aft trunk channel (12) was designed for having the same importance as the forward trunk channel, but after the tank experiments showing that the entire trawl net and trawl sack may be hauled in through the lock chamber, the aft trunk channel (12) is more useful as an auxiliary trunk channel for pulling out at least the aft portion (32) of the trawl sack (3) as a normal way of removing the trawl sack from the lock chamber (1), or for releasing the trawl sack (3) in case it gets stuck in the lock chamber (1).

In a preferred embodiment of the invention the pulling line (8) is extended from a net drum (7) that stands by the upper mouth of the forward trunk channel (16), and through the lock chamber (1). In the previous embodiment of the invention, the pulling line was guided back up through the aft trunk channel (16), and a pulling line gap (13, not illustrated) was formed between the transom plate (21), and the aft trunk channel (12). That pulling line gap extended downward and had a mouth in the lock channel (4) and the sluiceway (2), in order for the pulling line (8), after having been extended aft from the net drum (7) and attached to the forward end of the trawl sack (3) or the trawl sack extension (35), could be dropped through the pulling line gap (13) so that the pulling line went through the sluiceway. That solution is no longer the most preferred solution, and is not illustrated in this application. In FIG. 5 is illustrated that the trawl net (5) with the trawl sack (3) and the trawl sack extension (35) are being pulled by means of this pulling line (8) and achieve an nearly pointed "pencil-shape" which may facilitate the hauling through the sluiceway (2) to the lock chamber (1). The tank model indicated that a trawl sack containing approximately 100 tons of caught fish could be hauled in entirely in less than 60 seconds, using a pulling force of about 20 tons on the trawl drum (6).

According to a preferred embodiment of the invention it is not desirable to have the entire lock chamber with its full cross section arranged immediately adjacent to the stern. The solution to this is to arrange a lock canal (4) between the sluiceway (2) and the lock chamber (1), the lock canal (4) having a vertical cross-section lower than the vertical cross section of the lock chamber (1) including the lower portion (1b) below the grating (1c), such as illustrated in FIG. 1e, and in FIGS. 2 to 9, which gives the stem part of the vessel a somewhat more slender design. In the preferred embodiment of the invention, a lock chamber floor (19) is arranged deeper than the lower portion of the sluiceway (2) and the lock canal (4). To prevent longitudinal sloshing in the lock chamber (1), a baffle plate (9b) illustrated in FIG. 1e may be arranged near the transition from the lock canal (4) to the lock chamber (4), to be elevated to prevent longitudinal wave formation in the lock chamber (1) and lock canal (4) combined, and to be lowered before receiving the trawl net/trawl sack with the catch in the lock chamber (1). Mathematical modelling of the water's behaviour indicated that this baffle plate (9b) would be necessary, but the physical model tank experiments indicated that the baffle plate (9b) was not imperative.

With the invention, we previously preferred to haul the trawl net (5) via a trawl slipway (20) (not illustrated) arranged near the sluiceway (2). The trawl slipway was thus arranged for hauling the trawl net (5) over the deck The trawl net is arranged for being separated from the trawl sack (3), and in the previous embodiment of the invention the trawl net was separated from the trawl sack extension (35), whereby the trawl sack extension and the trawl sack was hauled through the sluiceway (2). We imagined that one could haul in the trawl net via the lock chamber without preferring to do that then, but we have reconsidered the solution to claim that a best mode of the invention now is to dispose with the trawl slipway and to haul the trawl net (5) and the trawl sack extension (35) and the trawl sack (3) in that sequence through the sluiceway (2) directly. Thus we do not prefer separating the trawl net (5) from the trawl sack extension (35) and the trawl sack (3) before hauling in the trawl sack extension (35) and the trawl sack (3) through the sluiceway.

A preferred embodiment of the invention has different cross-section areas along the distance from the stem end of the lock chamber (1), in order to attenuate waves in the lock chamber. This is achieved in both that the lock chamber floor (19) extends deeper from the lock canal (4) and forwards, whereby it rises by the forward end up towards the forward trunk channel (16), which further rises steeply in the forward direction. In a preferred embodiment of the invention the lock chamber ceiling (18) may rise in the forward end of the lock chamber (1) and run smoothly into the ceiling portion of the forward trunk channel (16).

The sluiceway (2) and the lock canal (4) are in a preferred embodiment of the invention enveloped by the vessel's hind part as a hydrodynamic shaped submerged part (41) of the hull, in order for the hind part to let the sea pass in a good way to create less wake during normal running through the sea. Thus, there may be arranged a lowered hind part (41) of the vessel's bottom (22) and transom plate (21) with the submerged hind part (41) enveloping the sluiceway (2), see FIG. 1a and FIG. 1e. This lowered hind part (41) also envelopes the lock canal (4) in the preferred embodiment of the invention.

In a previous embodiment of the invention, there was arranged a vertical separation zone (33v, not illustrated) to open up the trawl sack (3) to discharge the catch into the lock chamber (1). In the now preferred embodiment, there are arranged at least one horizontal zip (33h) in either starboard or port side of the trawl sack (3), to release the catch sidewards (or preferably so) see FIG. 3, and also FIGS. 6, 7, and 8. The horizontal zips may be continuous or separated into several zips. There may be a need to handle the separation zone or zip (33v, 33h), which shall split the trawl sack (3), if it is not possible to open or control by means of a release line (38), a so-called "saver", through the forward or aft trunk channel (16, 12). An inspection trunk shaft (14), see FIG. 6, is arranged through the lock chamber ceiling (18) generally above the central portion of the lock chamber (1), for inspection and manipulating the trawl sack (3), and possibly for manually splitting the trawl sack (3) if the zip (33v, 33h) at the middle of the trawl sack (3) does not release via the release line (38).

FIG. 10a shows in horizontal section an partial outline of the stern of the vessel as seen from above. In the following FIGS. 10b to 10f, an outline of the lock chamber (1) having an upper mouth in its forward end in the forward trunk channel (16), are shown. The lock gate (9) is shown in its open position in the sluiceway (2) in FIG. 7. The sluiceway may have different designs, e.g. as a hinged pivoting hatch, but in the preferred embodiment of the invention the lock gate (9) is designed as a vertical hatch for being lifted to open the sluiceway (2) and lowered again to prevent waves from penetrating.

FIGS. 10a to 10 shows horizontal sections with deck arrangements of the stem end of the vessel, all of which can be recognized in the longitudinal section of FIG. 2.

FIG. 10a shows an upper forecastle deck (24u) with trawl drums and the top of a transverse gallows crane (25) at the stern.

FIG. 10b is the lower forecastle deck, with trawl drums (also shown in FIG. 10a), and trawl winches and the upper mouths of the forward trunk channel, the aft trunk channel and an inspection trunk channel, and a trawl net ejection roller at the stern. Please note the wide upper mouth of the forward trunk channel.

FIG. 10c shows the shelter deck with the vertically passing forward and aft trunk channels (16, 12).

FIG. 10d shows the main deck with the top of the lock chamber with the lock canal and the sluiceway at the stern end, and the lower mouths of the forward and aft trunk channel.

FIG. 10e shows the platform deck with the lower portion of the sluiceway (2), the lock canal (4) and the widened lower portion (1b) of the lock chamber that is horizontally divided by a large grating (1c) to let pass the catch down to the lower portion (1b) of the lock chamber.

FIGS. 11a and b illustrate a side elevation view and an end elevation view of the stem gallows crane (25). The trawl wires (61sb, 61p) may run through blocks (25b) in the transverse bar of this gallows crane (25) in its forward turned position to have the pulling position ahead of the rudder position (see FIG. 2) while trawling, to increase the maneouverability of the trawling vessel. Conversely, the gallows crane (25) may be turned in an aft direction to facilitate landing of the trawl doors from the sea.

In the below following description a method for trawl catching marine bio-resources will be given, with a trawler vessel comprising trawl winches (62) for handling trawl wires (61) and trawl drums (6) for ejecting and hauling a trawl net (5) with an attached trawl sack (3) for collecting the catch. FIG. 3 illustrates in addition ancillary lines (51, 61) and trawl doors (60). The novel features of the invention is characterized by the following actions:

After hauling the trawl wires and trawl doors (51, 60, 61) is done, rather like the ordinary way, the trawl net (5) is in the preferred embodiment not disconnected from the trawl sack (3), but the front ends (53, 54) are attached to the pulling line (8) and the trawl net is then hauled in before hauling continues with the trawl sack extension, then the trawl sack (3) containing the catch, all through the sluiceway (2) mainly below the vessel's waterline, to the lock chamber (1) having its water volume being mainly below the vessel's waterline. In the previous best mode of the invention, the trawl net (5) was hauled in separately over a trawl slipway arranged near the sluiceway (2), and the trawl net was separated from the trawl sack (3) which was hauled in separately through the sluiceway (2) the previous method is possible, but no longer the preferred method.

FIG. 4 illustrates, as mentioned, a vertical section of the vessel according to a preferred embodiment of the invention, the trawl net and the trawl hauled in near the stem of the vessel. Previously, the trawl net was hauled in over the trawl slipway to a trawl drum on the forecastle deck, but a slipway is not included in the present preferred embodiment. The trawl net, the trawl sack extension and the trawl sack is disconnected from the trawl wires and then connected to a pulling line. The trawl is now ready to be hauled in through the sluiceway to the lock chamber. By using the trawl sack extension (35) one achieves that the trawl sack extension, mainly being without fish, takes the load over the drum (6) to spare the trawl sack itself, which contains the catch, from being squeezed. In the previous embodiment a separation zones (vertical zips (33v) not illustrated) between the trawl sack extension (35) and the trawl sack (5) was hauled up past the no longer strictly necessary trawl slipway and up on the deck so that the unzipping can be conducted on deck.

FIG. 5 shows how the pulling line (8) according to a preferred embodiment is beginning to haul in the front ends 53, 54) of the trawl net so that the trawl net (5) runs in through the sluiceway, through the lock canal (4), whereby the trawl sack or the trawl sack including the trawl sack extension may be pulled by a winch inwards through the lock chamber (1). The trawl sack extension will in this case bear the load while being wound up on the drum (7) above the mouth of the forward trunk (16) while the trawl sack with the catch is being pulled in through the sluiceway (2) and the lock canal (4). FIG. 5 shows additionally the pointed shape arising at the front end of the trawl sack when the extension of the trawl sack is tightened by the pulling line (8).

FIG. 6 is the same vertical section as FIG. 5, and shows an alterable way of retrieving the trawl sack (3) at the moment when it has been pulled entirely into the sluiceway (1). The trawl sack (3) according to a preferred embodiment is separated from the trawl net extension (35) and pulled off the catch, which may be rather close packed. The aft part of the trawl sack (3) is made ready for being pulled up through the aft trunk channel (12) to the net winch (71) on the deck.

FIG. 7 shows a preferred embodiment of the method according to the invention, in which the trawl sack is opened along vertical separation zones, the so-called zips (33h, 33sb, 33p) (see FIG. 6) in arranged preferably at starboard and port sides of the trawl sack (3). These zips (33h, 33sp, 33p) may be opened gradually as the trawl sack enters the lock chamber (1), is discharged gradually and then further wound up onto the drum (7) outside the forward trunk (16). The aft part (32) of the trawl sack is no longer necessarily pulled up through the aft trunk, but may be hauled in last through the forward trunk. The fish may then be pumped out of the lock chamber by means of a fish pump to e.g. a storage or for immediate refining in a factory on board the vessel.

The trawl sack containing the catch is floating while taken in through the sluiceway (2) to the lock chamber (3) in the stem portion of the vessel, with the sluiceway and the lock chamber mainly being below the waterline. In this way, crushing of fish is avoided in that the trawl sack may be hauled in fast, over few heave periods, and in that it is not pulled in along and over a trawl slipway. Hauling in the trawl sack fast into the lock chamber also prevents the sack from sinking to a vertical position, which would entail crushing of the catch during hauling.

An inspection trunk is arranged in the preferred embodiment in the area over the middle of the lock chamber where the zip (33) for the trawl sack will reside (see FIG. 6) so that the crew by means of an outlet from the lock chamber to a water pump may lower the water level and go down to split the trawl sack manually if it does not release by means of a release line through the forward or the aft trunk channel.

FIG. 8 is a longitudinal section of the stern part of the vessel, illustrating the lock chamber with the lock gate (9) lowered to close the sluiceway (2), and the baffle plate (9b) arranged to narrow the passage between the lock canal (4) and the lock chamber (1), without the trawl sack in the lock canal (4) (and usually without the trawl sack in the lock chamber (1). The effect of the baffle plate is to divide and shorten the waves longitudinal "runway" into the lock canal (4) and the lock chamber (1) and thus to reduce the intensity of sloshing inside the lock chamber. The widening and deepening of the lock chamber ahead of the lock canal (4) may also attenuate sloshing.

The invention claimed is:
1. A trawling vessel for use with a trawl net for catching marine bio-resources, with a trawl sack attached aft on a trawl net for keeping the catch, said vessel comprising lines for towing and hauling said trawl net and trawl drums for hauling said trawl net;

with a lock chamber in a stern of said vessel, said lock chamber having a main portion of its volume below a design water line of said vessel, said lock chamber being arranged for hauling said trawl sack with the catch from the sea, through a sluiceway in said stern, and said lock chamber being arranged for discharge of said trawl sack and for temporarily keeping said catch; and with a forward trunk channel and an aft trunk channel leading up from said lock chamber and being arranged so that said trawl sack, in a generally discharged state, may be hauled up through at least one of said trunk channels to a deck, thereby leaving said catch in said lock chamber; characterized by a ceiling covering generally all of said lock chamber, with said forward trunk channel running through said ceiling;

in which a portion of the ceiling is arranged to extend below the vessel's water line, for the prevention of free surface wave formation in the lock chamber, said aft trunk channel extending up through said ceiling from an aft end of said lock chamber, arranged for the entire, or an aft part, of said trawl sack in a generally discharged state, to be pulled up through said aft trunk channel.

2. The vessel of claim 1, having a forward trunk channel leading up from a forward end of said lock chamber and arranged so that said trawl sack, in a generally discharged state, may be hauled up through said forward trunk channel to a deck, leaving said catch in said lock chamber.

3. The vessel of claim 1, having trawl winches for said lines for towing and hauling said trawl net.

4. The vessel of claim 1, said lines being port and starboard lines, said lines provided with port and starboard trawl doors arranged on said port and starboard lines respectively, for spreading port and starboard front ends of said trawl net.

5. The vessel of claim 1, in which said lock chamber, mainly water-filled, being for hauling said trawl net in addition to said trawl sack with the catch, from the sea, through said sluiceway to said lock chamber.

6. The vessel of claim 1, having a widened upper mouth of said trunk channels for facilitating using either starboard or port trawl winches for hauling said net or said trawl sack.

7. The vessel of claim 1, said sluiceway also being arranged mainly below said vessel's design water line in said stern.

8. The vessel of claim 1, having a lock gate for closing and opening said sluiceway.

9. The vessel of claim 1, said sluiceway arranged near a centerline in said stern.

10. The vessel of claim 1, said stern being a transom stern.

11. The vessel of claim 1, a trawl sack extension arranged between said trawl net and said trawl sack.

12. The vessel of claim 11, with a pulling line arranged for being attached to a forward end of said trawl net or said trawl sack or said trawl sack extension, for hauling said trawl sack into said lock chamber.

13. The vessel of claim 12, in which said pulling line is arranged for being extended from a net drum arranged on a trawl deck, through said forward trunk channel and through said lock chamber, by means of a conveyor device.

14. The vessel of claim 12, in which said pulling line is arranged for being extended from a net drum and at least through the lock chamber and through said aft trunk channel and said sluiceway.

15. The vessel of claim 1, having a transverse roller in deck level at the top of said stern, for guiding the trawl net during ejection.

16. The vessel of claim 1, having a lock canal arranged between said sluiceway and said lock chamber, said lock canal having a relatively smaller cross-section area than the cross-section area of said lock chamber.

17. The vessel of claim 16, in which the lock chamber is widened forward of said lock canal and above a horizontal grating and said lock chamber storage sump arranged for providing space for fish being discharged from said trawl sack through zippers.

18. The vessel of claim 1, in which a lower lock chamber storage sump is arranged in a widened portion in said lock chamber, with a lock chamber floor being arranged deeper than a lower part of said sluiceway, and a horizontal grating.

19. The vessel of claim 1, said trawl sack having one or more horizontal zippers in either starboard or port sides of the trawl sack, to release the catch sidewards.

20. The vessel of claim 1, with a baffle plate arranged to be moved to block a part of the lock chamber's cross-section between said lock canal and said lock chamber, for attenuating sloshing in said lock chamber.

21. The vessel of claim 1, with a submerged hind part of the vessel's bottom and stern, in which said submerged hind part envelopes the sluiceway.

22. The vessel of claim 1, having an inspection trunk or shaft running through the lock chamber ceiling, mainly over the middle portion of the lock chamber, for inspecting and manual handling of the trawl sack, possibly manual splitting of the trawl sack if a release line for the zipper at the trawl sack cannot be released via a release line through the forward or aft trunk.

23. The vessel of claim 1, having one or more sluiceways arranged to the side of said vessel's centerline, in said stern.

24. A method for trawl catching of marine bio-resources, with a vessel comprising trawl winches and trawl drums for ejecting and hauling a trawl net and ancillary lines, with a trawl sack attached to the trawl net, said trawl sack arranged for keeping the catch, comprising:

hauling said trawl sack containing the catch, from the sea, through a sluiceway mainly below a waterline of said vessel, to a lock chamber having a water volume being mainly below said vessel's waterline, and releasing said catch along zippers in the trawl sack, through a grating to a lock chamber storage sump; and hauling in said trawl net over a transverse roller near the sluiceway, and the trawl net is then separated from the trawl sack and possibly a trawl sack extension, whereby the trawl sack and the trawl sack extension are hauled in separately through said sluiceway.

25. The method according to claim 24, in which the trawl sack is opened along a vertical zipper and hauled up through a forward or aft trunk channel so that the catch is kept in the lock chamber, and that the fish is pumped out of the lock chamber by means of a fish pump to either a storage area or for refining on board the vessel.

26. The method according to claim 24, further comprising using the trawl sack extension arranged between the trawl sack and the trawl net.

27. The method according to claim 24, further comprising using trawl doors which are disconnected from the hauling lines before hauling the trawl net on board the vessel.

28. A method for trawl catching of marine bio-resources, with a vessel including a trawl winch and a trawl drum for ejecting and hauling a trawl net, with a trawl sack attached to the trawl net, said trawl sack arranged for keeping the catch, the vessel including a lock chamber in a stern of said vessel and a forward trunk channel leading up from said lock chamber, the method comprising:

hauling the entire trawl net through the lock chamber and winding it continuously onto the drum above the forward trunk channel;

unzipping horizontally arranged zippers of the trawl sack when the trawl sack, with the catch, arrives to the lock chamber; and permitting the catch to fall out and drop through a grid to an underlying chamber.

* * * * *

UNITED STATES PATENT AND TRADEMARK OFFICE
CERTIFICATE OF CORRECTION

PATENT NO. : 7,165,502 B2
APPLICATION NO. : 10/501480
DATED : January 23, 2007
INVENTOR(S) : Roar Pedersen et al.

It is certified that error appears in the above-identified patent and that said Letters Patent is hereby corrected as shown below:

Title page, Assignee item [73] reads "Sintef Fiskeri havbruk AS" should read --Sintef Fiskeri OG Havbruk AS--

Signed and Sealed this

Seventh Day of August, 2007

JON W. DUDAS
*Director of the United States Patent and Trademark Office*